US011345602B2

(12) United States Patent
Aziz et al.

(10) Patent No.: US 11,345,602 B2
(45) Date of Patent: May 31, 2022

(54) POROUS CARBOXYLATED JUTE STICK ACTIVATED CARBON

(71) Applicant: KING FAHD UNIVERSITY OF PETROLEUM AND MINERALS, Dhahran (SA)

(72) Inventors: Md. Abdul Aziz, Dhahran (SA); Shakhawat Hossain Chowdhury, Dhahran (SA); Mohammad Abu Jafar Mazumder, Dhahran (SA); Md Imran Rahman Chowdhury, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 327 days.

(21) Appl. No.: 16/525,949

(22) Filed: Jul. 30, 2019

(65) Prior Publication Data

US 2021/0032113 A1  Feb. 4, 2021

(51) Int. Cl.
 *C01B 31/12* (2006.01)
 *C01B 32/324* (2017.01)
 *C01B 32/342* (2017.01)

(52) U.S. Cl.
 CPC .......... *C01B 32/324* (2017.08); *C01B 32/342* (2017.08); *C01P 2002/52* (2013.01); *C01P 2002/82* (2013.01); *C01P 2004/24* (2013.01); *C01P 2006/12* (2013.01); *C01P 2006/16* (2013.01)

(58) Field of Classification Search
 CPC .............................. C01B 32/324; C01B 32/342
 See application file for complete search history.

(56) References Cited

U.S. PATENT DOCUMENTS

| | | | | |
|---|---|---|---|---|
| 7,572,380 B2 * | 8/2009 | Cannon | ................. | B01D 15/00 210/681 |
| 7,923,411 B2 * | 4/2011 | Tanaka | .................... | B01J 20/30 502/416 |
| 8,496,734 B2 * | 7/2013 | Gadkaree | ............... | B01J 20/20 95/139 |

FOREIGN PATENT DOCUMENTS

| | | |
|---|---|---|
| CN | 102633259 A | 8/2012 |
| CN | 103318897 A | 9/2013 |
| CN | 103553037 A | 2/2014 |
| VN | 10010697 B | 10/2012 |

OTHER PUBLICATIONS

Ngoc Hoa Phan, et al., "Production of Fibrous Activated Carbons from Natural Cellulose (Jute, Coconut) Fibers for Water Treatment Applications", Carbon, vol. 44, 2006, pp. 2569-2577.
Mohammad Asadullah, et al., "Preparation of microporous activated carbon and its modification for arsenic removal from water", Journal of Industrial and Engineering Chemistry, vol. 20, 2014, pp. 887-896.
Priyanka R. Sharma, et al., "Lead removal from water using carboxycellulose nanofibers prepared by nitro-oxidation method", Cellulose, Feb. 2018, pp. 1-13.
Muataz Ali Atieh et al., "Effect of Carboxylic Functional Group Functionalized on Carbon Nanotubes Surface on the Removal of Lead from Water", Hindawi Publishing Corporation, Bioinorganic Chemistry and Applications, 2010, 9 pages.
Qi-xia Liu, et al., "Preparation and Characterization of Jute Stick-Based Activated Carbon", Journal of Nantong University (Natural Science Edition), Mar. 2012, 3 pages (Abstract only).
Mahmoud S. Hassan, et al., "Adsorption Kinetics of Toxic Heavy Metal Ions from Aqueous Solutions onto Grafted Jute Fibers with Acrylic Acid by Gamma Irradiation", Journal of Natural Fibers, vol. 15, Issue 4, 2018, pp. 506-516 (Abstract only).
Shahnaz Parvin, "Physico-Mechanical Properties of Chemically Treated Jute Fibre Reinforced Plastic Composites", Department of Chemistry, Bangladesh University of Engineering and Technology (BUET), Aug. 2014, 158 pages.
Md. Abdul Aziz, et al., "Highly porous carboxylated activated carbon from jute stick for removal of Pb2+ from aqueous solution", Environmental Science and Pollution Research, 2019, 14 pages.

\* cited by examiner

*Primary Examiner* — Stuart L Hendrickson
(74) *Attorney, Agent, or Firm* — Oblon, McClelland, Maier & Neustadt, L.L.P.

(57) ABSTRACT

Jute stick/stalk can be used to prepared and carboxylated to yield useful activated carbons, e.g., for removing $Pb^{2+}$ from drinking water. Such activated carbons can act as an inexpensive adsorbents using agricultural waste or by-products. Carboxylation of jute stick activated carbon (JSAC) can improve its efficiency for $Pb^{2+}$ removal, e.g., from aqueous solutions, even if its BET surface area is reduced. Carboxylated JSAC (JSAC-COO$^-$) can have surface areas around 615.3±0.5, 1, 2.5, 5, 10, 15, 20, or 25 m$^2$/g. JSAC-COO$^-$ can treat varied $Pb^{2+}$ concentrations, 10, 25 mg/L, etc., pHs, e.g., 4.0, 7.0, etc., temperatures, e.g., 15° C., 27° C., etc., and contact periods, e.g., 1, 5, 10, 15, 30, 60 minutes, etc., achieving up to 99.8% $Pb^{2+}$ removal within 15 minutes of contact JSAC-COO$^-$ adsorption capacity can be >25.0 mg $Pb^{2+}$/g, as well as other metal ions, with potential for water and/or gas treatment.

12 Claims, 17 Drawing Sheets

POROUS CARBOXYLATED JUTE STICK ACTIVATED CARBON

STATEMENT OF ACKNOWLEDGEMENT

The inventors gratefully acknowledge the support provided by the Deanship of Scientific Research (DSR) at King Fahd University of Petroleum & Minerals (KFUPM), Dammam, Saudi Arabia to fund this research (Grants No. RG 1409-1 & 2).

STATEMENT OF PRIOR DISCLOSURE BY INVENTORS

Aspects of the present disclosure were published online on Jun. 5, 2019 in "Highly Porous Carboxylated Activated Carbon from Jute Stick for Removal of $Pb^{2+}$ from Aqueous Solution," *Environmental Science and Pollution Research* (2019); https://doi.org/10.1007/s11356-019-05556-6—incorporated herein by reference in its entirety.

BACKGROUND OF THE INVENTION

Field of the Invention

The present disclosure relates to activated carbons and functionalized activated carbons, particularly from jute and/or jute stick, as well as syntheses of such (functionalized) activated carbons and their uses in, e.g., water treatment, water reconditioning, and/or waste management, esp. for removal of metals, such as contaminant, valuable, and/or toxic heavy metals, such as Pb.

Description of the Related Art

Metals with densities of 5 g/cm³ or higher are characterized as heavy metals. Water pollution with heavy metals is a significant environmental issue as heavy metals are toxic to human and ecological health. Lead (Pb) has an atomic weight of 207.2 g and density of 11.4 g/cm³. Lead forms a wide range of oxides, e.g., $Pb_2O$ to $PbO_2$, and forms a protective film on an exposed surface of bulk metal. Lead is one of the toxic heavy metals that pose a risk to humans and aquatic life, even at a low concentration, over long periods of exposure.

Children and young populations are the most vulnerable groups for exposure to lead in water. The International Agency for Research on Cancer (IARC, 2018) has classified lead as Group 2B (possible human carcinogen) and inorganic compounds of lead as Group 2A (probable human carcinogen), while the United States Environmental Protection Agency (USEPA, 2004) has classified lead as Group B2 (probable human carcinogen). The World Health Organization (WHO, 2011) and European Community Directive have set the guideline value to no more than 10 μg/L in drinking water. Health Canada (2015) has set the maximum acceptable concentration to 10 μg/L in drinking water, and the US EPA (2009) has the action level of 15 μg/L in drinking water.

Lead is a naturally occurring element, mainly buried in the earth's crust in insoluble and biologically inoffensive forms. Lead is generally found as PbS or as complex ores of lead and zinc sulfides with small fractions of silver or silver sulfides. Industrialization and biogenic activities have released large quantities of Pb and its by-products into the air, soil, and water. Lead is primarily used as a raw material in manufacturing industries, matches, explosives, pigments, storage batteries, paints, and fuels, that produce lead-contaminated wastewater and air, e.g., smelting and grinding industries, which are major sources of water pollution for drinking water supplies. As an example, lead concentrations in wastewater from battery manufacturing, acid mine drainage, tailing pond and steel production plants in 1985 were reported to be in the range of 0.5 to 25 mg/L.

Chronic exposure to lead in drinking water can induce multiple health effects. Lead has bioaccumulation and magnification properties, which can increase its concentrations to toxic levels. Chronic lead exposure can affect almost every organ and system in the body, and children below six years are the most vulnerable group to the effects of lead. Low concentrations of lead in blood can cause health problems including, hearing, learning, and behavior difficulties, slowed growth, lower intelligence quotient, and hyperactivity. Lead can cross the placental barrier during pregnancy, possibly resulting in serious effects to the mother and developing fetus, such as reduced fetal growth and premature birth. Adults exposed to lead can suffer from cardiovascular effects, increased blood pressure, hypertension, decreased kidney function, and reproductive problems. Consumption of elevated levels of lead increases the reactive oxygen species (ROS) in tissues, which can affect the male reproduction system, metabolism process, and cellular damage.

The removal of lead ions ($Pb^{2+}$) from drinking water at low-cost is an ongoing challenge. To remove $Pb^{2+}$ from aqueous solutions, methods including coagulation, adsorption, membrane filtration, ion-exchange, chemical precipitation, and reverse osmosis have been employed. Among these methods, adsorption has been preferred due mainly to its low-cost, high efficiency, and ease of use. Activated carbon-based adsorbents have been widely used for $Pb^{2+}$ removal. Many studies have developed activated carbon from different sources, including rice husks, rice straw, discarded automotive tires, rubber, wood sawdust, apricot stones, peanut shells, pecan shells, crab shells, fly ash, peat, and oil palm fibers, which have been applied to remove $Pb^{2+}$ from aqueous solution.

Non-toxic agricultural by-products are often preferred options for preparing adsorbents. However, finding the inexpensive and non-toxic raw materials for making activated carbon is a challenge. Selecting non-toxic, inexpensive, and widely available raw materials to produce activated carbon, e.g., for $Pb^{2+}$ removal from drinking water, would benefit these efforts. Jute stick, a component of jute, is an agricultural by-product that is cheap and abundant in Bangladesh, India, Thailand, Myanmar, and China. Jute fiber has been reported to be biodegradable and environmentally friendly. Jute stick and jute fiber have similar chemical constituents, indicating that jute stick is likely to be biodegradable and environmentally friendly. Jute is commonly used as a cooking raw material in rural areas.

Biomass-based activated carbon should have large specific surface area, potentially using functional groups, to increase the accessibility of heavy metals to the intra-pore spaces. Carboxylate-functionalized carbon nanotubes (CNT-$COO^-$) surfaces have been reported to have effectively adsorbed 150 to 230% more metal ions than non-functionalized CNT surface. Higher efficiency of COO—functionalized CNT in comparison to hydroxyl- and amide-functionalized CNTs has been reported for $Cd^{2+}$ removal, possibly due to the high negative charge of CNT-$COO^-$ leading, to higher affinity to heavy metals with pH-sensitive performance.

However, carboxylating CNTs and activated carbon, e.g., date palm derived carbon, has been shown to reduce the specific surface area significantly. Accordingly, a need remains for carboxylate functionalized carbon materials with high surface area for heavy metal removal. Treating biomass with different activation agents, such as $H_3PO_4$, NaOH, $ZnCl_2$, $K_2CO_3$, $KHCO_3$, and KOH may alter the surface area, pore size, and/or shape of the carbon materials prior to pyrolysis.

Although activated carbon prepared from jute stick has been investigated for removal of heavy metals from industrial wastewater, the effect of carboxylate functionalized jute stick activated carbon on heavy metal adsorption was conventionally unknown Efforts have been made in the field of activated carbons and functionalized activated carbons, such as the following. VN 10010697 B by Do et al. (Do) discloses a method for manufacturing magnetic activated carbon (MAC) with magnetic agents having high strength $M_xFe_{3-x}$, $O_4$ (M:Mn, Cu, Ni; 0<x<3) for treating water containing As and contaminated organic compounds. Do discloses: impregnating carbon active agents and a mixture of magnetic precursors into the inner structure of activated carbon; burning in a $N_2$-containing medium to provide MAC. Do's MAC can absorb As and oxidize contaminated organic compounds, removing nearly 100% of methyl orange after 30 minutes of reaction with $NiFe_2O_4$-containing MAC, and can be recovered by magnetic separation, Do's carbon active agents are impregnated with acid(s) such as $HNO_3$, $H_2SO_4$, HCl, acidic salts soluble in water and magnetic precursor solutions such as $NH_4Cl$, $NH_4NO_3$, and Fe ions with Mn ions, or Ni ions, or Cu ions, excluding phosphorus-containing compounds, then Do's impregnated AC is combusted in a silica tube furnace at ~600° C. for 60 minutes with $N_2$ gas flowing at 100 mL/min to provide MAC, Do does not produce carboxylated activated carbon using $NaHCO_3$ as the activating agent, nor $Pb^{2+}$ removal from water using carboxylated AC.

CN 102633259 A by Liu et al. (Liu) discloses a jute-based active carbon (AC) made by: soaking jute fibers or crushed jute stem materials in a beaker filled with 3 to 5 M $H_3PO_4$ (aq); boiling to impregnate the fibers with an, activating agent; sintering in a vacuum tubular furnace at 400 to 500° C. under $N_2$ for 1 to 3 hours, or microwaving in a columnar quartz tube at 100 to 700 W for 5 to 30 minutes under $N_2$; cooling, acid-washing, and water-washing to pH is 6 to 7; then drying to obtain the jute-based AC. Liu's jute-based AC can absorb methylene blue adsorption. While Liu may describe sodium or potassium hydroxide as optional activating agents. Liu does not disclose a carboxylated AC, nor carboxylated AC activated with $NaHCO_3$, nor $Pb^{2+}$ removal from water with carboxylated AC.

CN 103553037 A by Sun (Sun) discloses a jute stalk modified AC is prepared by from a raw material mixture including jute stalk, various clay-like minerals, polyacrylic acid, humic acid, and water. Sun's jute stalk is modified AC has a porous structure, high specific surface area, an iodine value of 1556 mg/g, and methylene blue adsorption value of 26.7 mL/0.1 g. Sun appears to calcine an acidic formulation to form its AC and does not disclose carboxylation of its AC, nor removing lead from water with its AC.

CN 103318887 A by Huang et al. (Huang) discloses preparing AC from ambary (*Hibiscus cannabinus*, an East Indian fiber plant) straws, involving treating cut ambary straws a $H_2SO_4/K_2SO_4$ solution for 40 to 50 hours before carbonizing at 800 to 1100° C. for 4 to 8 hours, cooling, and pickling with 20 to 25 wt. % HCl for 4 to 8 hours. Huang mentions the use of alkali metal hydroxides (mainly lithium, sodium, potassium) as activators to produce a granular AC. Huang does not describe carboxylated AC, nor removing Pb ions from water.

*Carbon* 2006, 44(12), 2569-2577 by Phan et al. (Phan) discloses fibrous ACs made from jute and coconut fibers by physical activation, i.e., heating raw fibers at 950° C. in an inert atmosphere then activating with $CO_2$ at the same temperature, and chemical activation. i.e., impregnating raw fibers with $H_3PO_4$ and heating at 900° C. in an inert atmosphere. Phan mentions using these fibrous ACs for industrial wastewater treatment and tested for adsorption with phenol, Acid Red 27, and $Cu^{2+}$ ions. Phan describes activation post carbonization with $CO_2$ or with $H_3PO_4$, $HNO_3$, or KOH, but teaches $H_3PO_4$ activation to be the most suitable process to produce fibrous AC from cellulose fiber, leading to porous materials with $S_{BET}$ up to 1500 $m^2/g$ adsorption capacity up to 181 mg/g (for phenol). Phan's AC has acidic surface groups involved in the adsorption of dyes and metal ions, but contains phosphate, phosphonate, lactone, and carbonyl groups on the AC surface. Phan's fibrous ACs have $S_{BET}$ in a range of from 912 to 1303 $m^2/g$.

*J. Indus. Eng. Chem.* 2014, 20(3), 887-896 by Asadullah et al. (Asadullah) discloses As removal from water using AC. Asadullah describes chemically activated carbon (CAC) using $H_3PO_4$ from jute stick to obtain a microporous structure with surface functional groups, and physically activated carbon (PAC) with mainly meso- and macropores. Asadullah's CAC and PAC reduced As concentration to 45 and 55 µg/L, respectively, from 100 µg/L while iron-loaded CAC reduced As concentration to 3 µg/L. Asadullah reports the CAC micropore structure and complexation affinity of iron species towards As species to enhance As separation.

*Cellulose* 2018, 25(3), 1961-1973 by Sharma et al. (Sharma) discloses extracting carboxycellulose nanofibers from untreated jute using nitro-oxidation with $HNO_3$—$NaNO_2$. Sharma's nitro-oxidized carboxycellulose nanofibers (NOCNF) had a crystallinity of 35%, a carboxylate content of 1.15 mmol/g, and surface charge of –70 mV. Sharma states that such NOCNF are excellent substrates for Pb(II) ion removal from water, e.g., a 0.23 wt. % NOCNF suspension could remove Pb(II) ions ranging from 50 to 5000 ppm in less than 5 minutes at room temperature and pH~7. Sharma's NOCNF had an adsorption efficiency of 2270 mg/g based on the Langmuir isotherm analysis. Sharma's removal efficiency was due to adsorption, dominating at Pb(II) concentrations up to 1000 ppm, and mineralization of lead hydroxide, $Pb(OH)_2$, crystallization dominating at Pb(II) concentrations greater than 1000 ppm. Sharma reports nanoscale $Pb(OH)_2$ crystallization, induced by a Pb(II)-NOCNF aggregated scaffold. However, Sharma does not describe carboxylated AC, nor materials that are stable in stable in water.

*Bioinorg. Chem. Applic.* 2010, 603978, 1-9 by Atieh et al. (Atieh) discloses removing lead from water with surface-carboxylated carbon nanotubes. Atieh reports that pH, dosage, contact time, and agitation speed can affect the lead adsorption capacity from water. Atieh's carbon nanotubes had diameters from 20 to 40 nm with an average diameter of 24 nm and average length of 10 µm. Atieh reports 100% lead removal with COOH-MCNTs at pH 7, 150 rpm, and 2 hours. CNTs like Atieh are known to have $S_{BET}$s between 6 and 275 $m^2/g$. Atieh does not describe carboxylated ACs of non-tubular morphology.

*J. Nantong Univ. Nat. Sci. Ed.* 2012-3, entitled "Preparation and Characterization of Jute Stick-Based Activated Carbon," by Liu et al. (Liu NPL) discloses jute stick-based activated carbon prepared using an $H_3PO_4$ activating agent.

The Liu NPL reports the optimum conditions to be $H_3PO_4$ concentration of 2 mol/L, activation temperature of 400° C., and activation time of 1 h. The Liu NPL's AC has an iodine adsorption value of 1059.26 mg/g, a methylene blue adsorption value of 353.10 mg/g, a specific surface area of 1779.4 m$^2$/g, a total pore volume is 0.960 cm$^3$/g, and an average pore size of 2.16 nm, showing highly mesoporous structures. The Liu NPL does not, employ $NaHCO_3$ activation and nor describe Pb removal from water.

J. Nat. Fibers 2018, 15(4), 505-516 by Hassan et al. (Hassan) discloses using jute fibers as an adsorbent substrate for $Pb^{2+}$ and $Hg^{2+}$ ions from aqueous solutions after graft copolymerization with polyacrylic acid under the effect of gamma irradiation. Hassan reports its material to have a second order adsorption kinetics and follow a Langmuir adsorption isotherm model, having higher adsorption capacities at pH 5 for $Pb^{2+}$ and pH 6 for $Hg^{2+}$. Hassan does not describe carboxylated AC, nor using jute sticks/stalks.

The master's thesis entitled "Physico-Mechanical Properties of Chemically Treated Jute Fibre Reinforced Plastic Composites," from the Dept. of Chemistry of the Bangladesh University of Eng. & Tech. published August, 2014, by Shahnaz Parvin (Parvin) discloses different types jute reinforced polypropylene (PP) composites prepared by single screw extrusion followed by injection molding. Parvin uses unbleached raw jute fibers oxidized with sodium periodate in oxidized jute reinforced PP composites. Parvin discloses para-nitroso-coupled oxidized jute-PP composites using N',N-dimethyl phenyl amine. Parvin does not describe producing the porous and/or carboxylated AC from jute, nor Pb removal from water with such materials.

In light of the above, a need remains for activated carbon (AC) materials, particularly for functionalized ACs, such as carboxylated and/or porous ACs, and methods of making such materials, especially from cheaper raw materials than CNF and/or jute fibers, as well as for using such AC materials in removal of metals, particularly toxic metals and/or metalloids (ions or otherwise), such as Pb, from waste water, drinking water, exhausts, and the like.

SUMMARY OF THE INVENTION

Aspects of the invention provide carboxylated jute stick activated carbons, comprising: graphitized carbon comprising micropores, mesopores and macropores with pore diameters in range of from 1.5 to 200 nm; carboxylate groups covalently bonded to the graphitized carbon; wherein the carboxylated jute stick activated carbon has a BET surface area in a range of from 500 to 750 m$^2$/g. Such activated carbons may be modified in any manner and/or with any permutation of the features described herein, particularly any permutation of the following.

Inventive activated carbons may have an IR spectrum comprising a first peak in a range of from 3500 to 3400 cm$^-$ and a second peak in a range of from 2400 to 2300 cm$^{-1}$, wherein the first peak has a height which is at least 75% of a height of the second peak. An integral of the first peak may be at least 1.25-fold an integral of the second peak.

A BJH average pore width of inventive activated carbons may be in a range of from 5 to 12.5 nm.

Inventive activated carbons may have a powder morphology and/or may comprise nanosheets.

Aspects of the invention comprise methods of making carboxylated jute stick activated carbon. Such methods may comprise; heating a mixture comprising (i) comminuted jute stick and (ii) bicarbonate and/or carbonate under an inert atmosphere, to obtain a jute stick activated carbon; and carboxylating the jute stick activated carbon to obtain carboxylated jute stick activated carbon.

Inventive methods may be ones in which the carboxylating comprises: mixing the jute stick activated carbon with $H_2SO_4$ and $HNO_3$, to obtain a mixture; sonicating the mixture, to obtain a sonicated mixture; and/or recovering the carboxylated jute stick activated carbon from the sonicated mixture. The $H_2SO_4$ and $HNO_3$ may be concentrated $H_2SO_4$ and/or concentrated $HNO_3$, and/or the $H_2SO_4$ and $HNO_3$ may be present in the mixing at a ratio in a range of from 1:2 to 6:1. The sonicating may take place for a period of from 4 to 6 hours. The recovering may comprise: diluting the sonicated mixture with water, to obtain a diluted mixture; separating the diluted mixture into an upper layer and a lower layer; and/or recovering the carboxylated jute stick activated carbon from the lower layer.

In the heating according to inventive methods, a mass ratio of a dry mass of (i) the comminuted jute stick to (ii) the bicarbonate and/or carbonate may be in a range of from 1:1.5 to 1:8.

The heating according to inventive methods may be at a temperature in a range of from 700 to 1000° C., and/or the heating may take place for a time range of from 3 to 8 hours.

Inventive methods may comprise, in the heating, bringing the comminuted jute stick and bicarbonate to a temperature in a range of from 800 to 900° C. at a heating rate of from 3 to 7° C./minute; and/or heating at the temperature for a period in a range of from 4 to 6 hours, to obtain the jute stick activated carbon; and optionally thereafter cooling the jute stick activated carbon to no more than 55° C. at a rate of from 7.5 to 12.5° C./minute.

Inventive methods may further comprise, after the heating: cooling the jute stick activated carbon to no more than 50° C., to obtain a cooled jute stick activated carbon; washing the cooled jute stick activated carbon with an acid, to obtain an acid-washed jute stick activated carbon; and/or deacidifying the acid-washed jute stick activated carbon to a pH in a range of from 6.5 to 7.5.

In inventive methods, the bicarbonate and/or carbonate may comprise at least 75 wt. % of an alkali metal and/or alkaline earth metal bicarbonate.

Aspects of the invention include methods comprising contacting a first gas or liquid with a carboxylated jute stick activated carbon made by any permutation of the inventive activated carbon(s) described herein and/or any permutation of the inventive method(s) described herein, thereby reducing an amount of one or more metal ions in the first gas, or liquid to obtain a second gas or liquid comprising fewer of the one or more metal ions than the first gas or liquid. The one or more metal ions (removable by the inventive methods and/or activated carbons) may include $Pb^{2+}$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
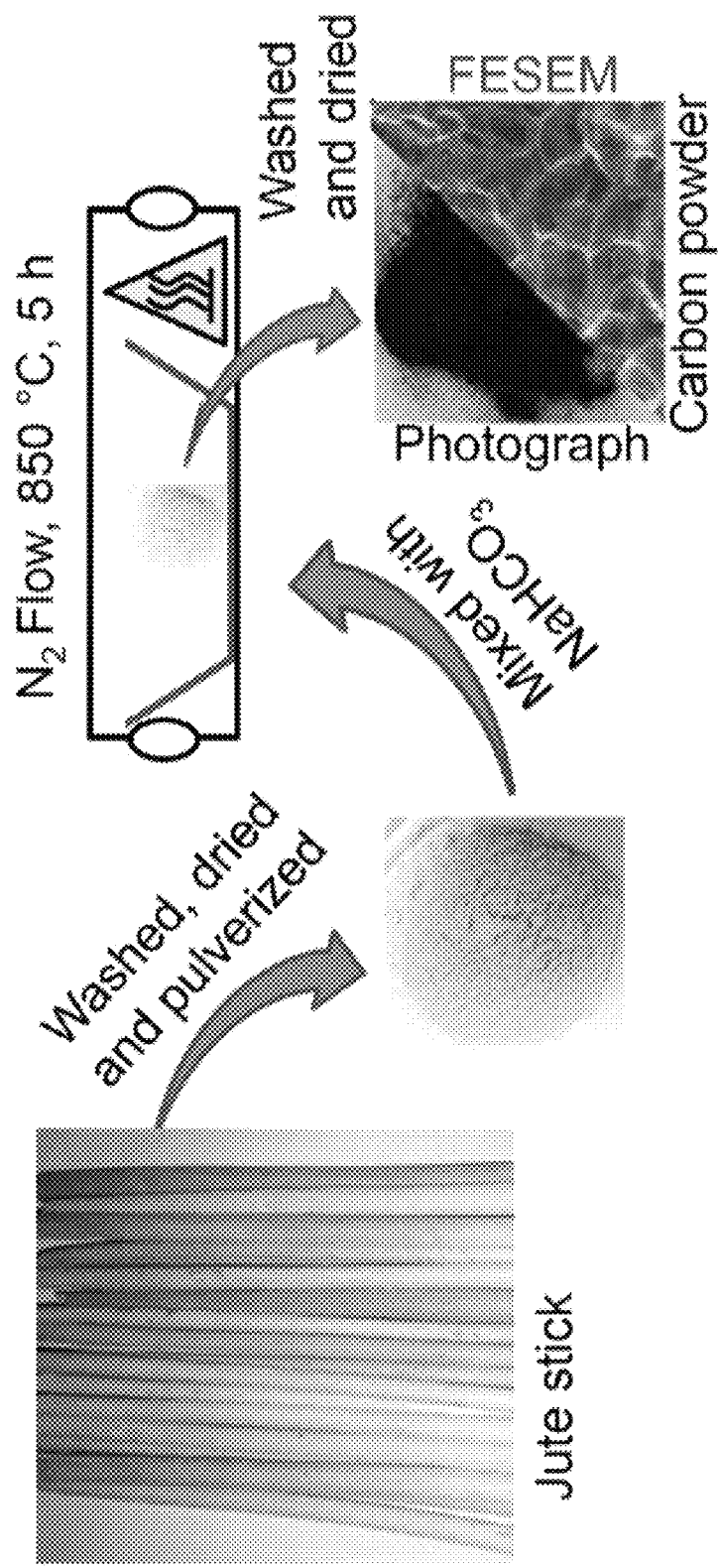
FIG. 1 shows an exemplary preparation of porous activated carbon from jute stick within the scope of the invention.

Aspects of the invention provide carboxylated jute stick activated carbons. Inventive activated carbons can be made from raw materials comprising at least 50, 60, 70, 75, 80, 85, 90, 91, 92, 92.5, 93, 94, 95, 96, 97, 97.5, 98, 99, 99.1, 99.5, or 99.9 wt. % of jute sticks, which may be the stalks of jute or typically the less fibrous material left behind after removal (or substantial removal) of the jute fibers, ribbons, and the like, generally post retting.

The graphitized carbon in the inventive activated carbons may comprise mesopores and micropores with pore diameters in range of from 1.5 to 200 nm, e.g., monomodal, bimodal, trimodal, or further multimodal distributions together or separately having diameters of any of these endpoints and/or at least 1.6, 1.7, 1.75, 2, 2.5, 3, 5, 7.5, 10, 15, 20, 25, 33, 50, 75, or 100 nm and/or up to 175, 165, 150, 145, 140, 135, 130, 125, 120, 115, 110, 100, 95, 90, 85, 80, 75, 65, or 50 nm. Carboxylate groups may be covalently bonded to the graphitized carbon, though inventive activated carbons typically have no more than 10, 7.5, 5, 4, 3, 2.5, 2, 1, 0.5, 0.1, 0.01, 0.001, 0.0001, 0.00001, 0.000001, or 0.0000001 mol. % of phosphate functionalization, phosphonate functionalization, phosphoryl functionalization, and/or phosphoric acid residual groups, relative to total functional groups bonded to the graphitized carbon. Inventive activated carbons are generally made without phosphoric acid, and may use no more than 25, 20, 15, 10, 5, 4, 3, 2, 1, 0.5, 0.1, 0.001, or 0.0001 wt. % $H_3PO_4$, relative to total activating agent weight. Inventive activated carbons may comprise no UV and/or fluorescence-detectable amounts of phosphate residues. Inventive carboxylated jute stick activated carbon may have BET surface areas in a range of from 500 to 750 $m^2/g$, e.g., any of these endpoints and/or at least 505, 510, 515, 525, 535, 550, 560, 570, 575, 580, 590, 595, 600, 605, 610, 615, 620, or 625 $m^2/g$ and/or up to 725, 715, 700, 695, 690, 680, 675, 670, 665, 660, 655, 650, 645, 640, 635, 630, 625, 620, or 615 $m^2/g$.

The carbon in inventive activated carbons may make up at least 72, 72.5, 73, 73.5, 74, 74.5, 75, 76, 77, or 78 wt. % of the activated carbon by elemental combustion analysis, based on C, H, N, O present.

Inventive activated carbons may have an IR spectrum comprising a first peak in a range of from 3500 to 3400 $cm^{-1}$ and a second peak in a range of from 2400 to 2300 $cm^{-1}$, wherein the first peak has a height which is at least 75, 80, 85, 90, 95, 100, 105, 110, 115, or 120% of a height of the second peak, but generally no more than 200, 175, 150, 145, 140, 135, 130, 125, 120, 115, 110, 105, or 100%. An integral of the first peak may be at least 1.25-fold an integral of the second peak, e.g., at least 1.33, 1.4, 1.5, 1.6, 1.7, 1.8, 1.9, 2, or 2.5-fold and/or up to 5, 4.5.4, 3.5, 3., 2.5, 2, 1.9, 1.8, 1.75, 1.67, or 1.5-fold.

A BJH average pore width of inventive activated carbons may be in a range of from 5 to 12.5 nm, e.g., any of these endpoints and/or at least 5.5, 6, 6.5, 7, 7.5, 8. 8.25, 8.5, 8.75, or 9 nm and/or up to 12, 11.5, 11, 10.5, 10, 9.75, 9.5, 9.25, 9, or 8.75 nm.

Inventive activated carbons may have a powder morphology and/or may comprise nanosheets, rather than tube, fiber, and/or rod structures. Inventive activated carbons have predominant nanosheet morphology. The longest dimension of inventive activate carbon microstructures is in the range of from 2 to 60 μm, e.g., any of these endpoints and/or at least 2.5, 3, 4, 5, 7.5, 10, 12.5, or 15 μm and/or up to 55, 50, 45, 40, 35, 30, or 25 μm. Inventive aspect ratios are generally no more than 8:1, 6:1, 5:1, 4:1, or the like in one plane, i.e., inventive particles are generally not rod-shaped.

Aspects of the invention comprise methods of making carboxylated jute stick activated carbon. Such methods may comprise: heating a mixture comprising (i) comminuted jute stick and (ii) bicarbonate and/or carbonate under an inert atmosphere, to obtain a jute stick activated carbon; and carboxylating the jute stick activated carbon to obtain carboxylated jute stick activated carbon. The term "comminuted" is meant to cover chopping, cutting, milling, grinding, pulverizing, shredding, and/or chipping, i.e., reducing a solid bulk piece into several smaller pieces, e.g., 15, 10, 7.5, 5, 4, 3, 2, 1, 0.5, 0.1, 0.01, 0.001, 0.0001% or even less the size/volume of the original solid bulk piece. The (precursor) mixture generally contains blended, mixed powders, slurries, or the like of the comminuted jute stick and base, e.g., $Na^+$, $K^+$, $Li^+$, $Mg^{2+}$, $^+N(CH_3)_4$, $^+N(CH_2CH_3)_4$, $Ba^{2+}$, $Cs^+$, $Sr^{2+}$, $Ag^+$ cations combined with $HCO_3^-$ and/or $CO_3^{2+}$, preferably sodium and/or potassium and/or preferably bicarbonate.

Inventive methods may be ones in which the carboxylating comprises: mixing the jute stick activated carbon with $H_2SO_4$ and $HNO_3$, to obtain a mixture; sonicating the mixture, to obtain a sonicated mixture; and/or recovering the carboxylated jute stick activated carbon from the sonicated mixture. The $H_2SO_4$ may be concentrated $H_2SO_4$, e.g., at least 65, 67, 70, 75, 80, or 86 wt. % and/or up to 98, 97, 96, 95, or 94 wt. % $SO_3$ in water, and/or the $HNO_3$ may be concentrated $HNO_3$, e.g., at least 90, 91, 92, 93, 94, 95, or 96 wt. % and/or up to 90, 86, 80, 75, 70, or 68 wt. % $NO_2$ in water. The $H_2SO_4$ and $HNO_3$ may be present in the mixing at a ratio in a range of from 1:2 to 6:1, e.g., any of these endpoints and/or at least 1:1.5, 1:1, 1.5:1, 1.75:1, 2:1, 2.25:1, 2.5:1, 2.75:1, or 3:1 and/or up to 5.5:1, 5:1, 4.5:1, 4:1, 3.75:1, 3.5:1, 3.25:1, or 3:1. The sonicating may take place for a period of from 3, 3.5, 4, 4.5, 5, or 5.5 to 8, 7.5, 7, 6.5, 6, 5.5, or 5 hours. The recovering may comprise: diluting the sonicated mixture with water, to obtain a diluted mixture; separating the diluted mixture into an upper layer and a lower layer; and/or recovering the carboxylated jute stick activated carbon from the lower layer. Separation or recovery may involve centrifugation or other known methods.

In the heating according to inventive methods, a mass ratio of a dry mass of (i) the comminuted jute stick to (ii) the bicarbonate and/or carbonate may be in a range of from 1:1.5 to 1:8, e.g., any of these endpoints and/or at least 1:2, 1:2.5, 1:3, 1:3.5, or 1:4 and/or 1:7.5, 1:7, 1:6.5, 1:6, 1:5.5, 1:5, 1:4.5, or 1:4.

The heating according to inventive methods may be at a temperature in a range of from 700 to 1000° C., e.g., any of these endpoints and/or at least 725, 750, 775, 800, 825, or 850° C. and/or up to 975, 950, 925, 900, 875, or 850° C., and/or the heating may take place for a period in a range of from 3 to 8 hours, e.g., any of these endpoints and/or at least 3.5, 4, 4.25, 4.5, 4.75, or 5 hours and/or 7.5, 7, 6.5, 6.25, 6, 5.75, 5.5, 5.25, or 5 hours.

Inventive methods may comprise, in the heating, bringing the comminuted jute stick and bicarbonate (or carbonate) to a temperature in a range of from 800 to 900° C. or any temperature described as acceptable above, at a heating rate of from 3, 3.5, 4, 4.5, or 5° C./minute to 7, 6.5, 6, 5.5, or 5° C./minute; and/or heating at the temperature for a period in a range of from 4 to 6 hours or any time period described as acceptable above, particularly 5 hours, to obtain the jute stick activated carbon; and optionally thereafter cooling the jute stick activated carbon to no more than 55, 50, 45, 40, 37.5, 35, 32.5, 30, 27.5, 25, 22.5, 20, 17.5, 15, or 12.5° C. (generally room temperature and/or ambient temperature) at a rate of from 7.5, 8, 8.5, 9, 9.5, or 10° C./minute to 12.5, 12, 11.5, 11, 10.5, or 10° C./minute.

Inventive methods may further comprise, after the heating: cooling the jute stick activated carbon to no more than 50, 45, 40, 37.5, 35, 32.5, 30, 27.5, 25, 22.5, 20, 17.5, 15, or 12.5° C. (generally room temperature and/or ambient temperature), to obtain a cooled jute stick activated carbon; washing the cooled jute stick activated carbon with an acid, such as HI, HBr, HCl, sulfuric acid, perchloric acid, acetic acid, and/or citric acid, to obtain an acid-washed jute stick activated carbon; and/or deacidifying, generally by washing with water, (optionally dilute) ammonia, and/or (optionally dilute) bicarbonate, the acid-washed jute stick activated carbon to a pH in a range of from 6.5 to 7.5, e.g., any of these endpoints and/or at least 6.6, 6.7, 6.8, 6.85, 6.9, 6.95, or 7 and/or up to 7.4, 7.3, 7.2, 7.15, 7.1, 7.05, or 7.

In inventive methods, the bicarbonate and/or carbonate may comprise at least 75, 80, 85, 90, 91, 92, 92.5, 93, 94, 95, 96, 97, 97.5, 98, 99, 99.1, 99.5, or 99.9 wt. % of a total weight of the total base weight, of an alkali metal and/or alkaline earth metal bicarbonate, particularly including a sodium and/or potassium cation and/or particularly a bicarbonate.

Aspects of the invention include methods comprising contacting a first gas or liquid with a carboxylated jute stick activated carbon made by any permutation of the inventive activated carbon(s) described herein and/or any permutation of the inventive method(s) described herein, thereby reducing an amount of one or more metal ions in the first gas or liquid to obtain a second gas or liquid comprising fewer of the one or more metal ions than the first gas or liquid. The first liquid may be a drinking water precursor or even waste water. The first gas may be a refinery exhaust, a coal-fired plant exhaust, a nuclear heat stack, or a cracker exhaust. The one or more metal ions (removable by the inventive methods and/or activated carbons) may include $Pb^{2+}$, but may be one or more of Pb, Cr, Co, Ni, V, Nb, Ge, Ga, Hg, Cd, Sn, Sb, Bi, and/or As, particularly in ionic form. Aspects of the invention provide a filter comprising inventive activated carbon(s) as described herein.

Inventive adsorbents, particularly inventive activated carbons and compositions thereof, need not be (ferro)magnetic and will function efficiently, e.g., attain at least 75, 80, 85, 90, 91, 92, 92.5, 93, 94, 95, 96, 97, 97.5, 98, 99, 99.1, 99.5, or 99%, metal ion (esp. $Pb^{2+}$) within 10, 8, 6, 4, 3, 2, 1 minutes or fewer of contact time, without relying magnetism.

Inventive activated carbon materials need not contain more than 5, 4, 3, 2.5, 2, 1, 0.5, 0.1, 0.01, 0.001, 0.0001, 0.00001, or 0.000001 wt. %, relative to total adsorbent weight, of Mn, Cu, and/or Ni, either individually or in combinations. Inventive adsorbents, in unused form, i.e., before abstracting and/or adsorbing metals, contain no more than 1, 0.5, 0.1, 0.01, 0.001, 0.0001, 0.00001, or 0.000001 wt. %, relative to the total adsorbent weight, of metals, particularly Mn, Cu, and/or Ni, on the surface of the adsorbent and/or impregnated within the adsorbent. Inventive adsorbents, in unused form, i.e., before abstracting and/or adsorbing metals, contain no more than 1, 0.5, 0.1, 0.01, 0.001, 0.0001, 0.00001, or 0.000001 wt. %, relative to the total adsorbent weight, of Si and/or Al, individually or in combination.

Inventive activated carbon materials need not contain more than 10, 7.5, 5, 4, 3, 2.5, 2, 1, 0.5, 0.1, 0.01, or 0.001 mol. % (or wt. %), relative to the total amount of functional groups on the activated carbon, of phosphate, phosphoryl, and/or phosphoric acid residual, surface functionalization. Inventive activated carbon materials need not contain more than 10, 7.5, 5, 4, 3, 2.5, 2, 1, 0.5, 0.1, 0.01, or 0.001 mol. % (or wt. %), relative to the total amount of functional groups on the activated carbon, of nitrate, nitroso, and/or phosphoric acid residual, surface functionalization. Inventive activated carbon materials and/or formulations may include less than 25, 15, 10, 5, 2.5, 1, 0.1, or 0.01 wt. %, based on total adsorbent weight, of a zeolite, silica gel, palygorskite, bentonite, synthetic polymer (such as PE, PP, PET, polyacrylic acid, etc., or combinations of these), rectorite, and/or diatomite. Inventive formulations may exclude humic acid, or contain no more than 5, 4, 3, 2.5, 2, 1, 0.1, or 0.01 wt. % of humic acid, based on total adsorbent weight. Inventive activated carbon materials generally avoid grafting (modification) with synthetic and/or natural polymers, such as poly (meth)acrylic esters, poly (meth)acrylic acids, poly vinyl alcohols, PEG, PPG, ROMP-polyesters and/or polyamides, (optionally biological) polypeptides, etc. Inventive activated carbons are useful without reinforcement from and polymer, such as a polyolefin (e.g., PE, PP, PIB, PB, rubber, and the like, including mixtures and/or combinations), polyacrylate, polyester, polyamide, polyalcohol, polyether, polysulfone, polyurethane, and/or polycarbonate.

Inventive activated carbons will generally have only one IR peak in the range of 2400 to 2300 $cm^{-1}$ and/or the most prominent peak in strength and width in the range of 3500 to 3300 $cm^{-1}$. The highest integral IR peak may be in the range of 3500 to 3300 $cm^{-1}$.

Aspects of the invention provide carboxylated jute stick activated carbon (JSAC-COO$^-$) suitable to remove more than 90%, e.g., up to 91, 92, 92.5, 93, 94, 95, 96, 97, 97.5, 98, 99, 99.1, 99.5, or 99.9%, of aqueous phase $Pb^{2+}$ ions within one (1) minute of contact time. In 15 minutes of contact time, up to 99.8% $Pb^{2+}$ ion removal can be achieved in certain batch systems, e.g., at least 95, 96, 97, 97.5, 98, 99, 99.1, 99.5, or 99.9% and/or up to 99.995, 99.99, 99.95, 99.9, 99.5, 99.1, 99, 98.75, 98.5, 98.25, or 98%. Aspects of the invention comprise applying JSAC-COO$^-$ generally having excellent efficiency within the operational ranges of pH and temperature in water supply and/or water waste systems, which can reduce treatment costs. Inventive adsorbents can be applied for wide ranges of initial metal contaminant (esp. $Pb^{2+}$) concentrations, pH, and temperature. Inventive adsorbents can be used on both domestic and industrial scales. Aspects of the invention include decreasing treatment toxicity and/or the toxicity of JSAC-COO$^-$, particularly in regard to the amount of acid needed in the process of carboxylation.

Aspects of the invention provide adsorbent(s) comprising jute stick activated carbon (JSAC) and/or carboxylated jute stick activated carbon (JSAC-COO$^-$) produced from jute stick (and/or other components of jute), an inexpensive agricultural byproduct abundant in the South and Southeast Asian countries. Aspects of the invention include preparation(s) of activated carbon from at least 75, 80, 85, 90, 92.5, 95, 97.5, 98, 99, 99.1, 99.5, or 99.9 wt. % jute stick, based on total carbonaceous starting materials, and/or functionalization an activated carbon, preferably containing at least 50, 60, 70, 75, 80, 85, 90, 95, 97.5, or 99 wt. % JSAC, to produce JSAC-COO$^-$. Aspects of the invention comprise mass scale production and/or carboxylation of JSAC and/or JSAC-COO$^-$ for, e.g., domestic and industrial applications. Aspects of the invention provide using JSAC and/or JSAC-COO$^-$ for domestic and industrial wastewater treatment, and/or co-removal of multiple heavy metals, such as Ph, Mo, Bi, Hg, Cd, Ga, Tl, Mn, Cr, Os, and/or W (as well as Be, As, V, Ga, Sr, Rb, Sc, and/or Cs), from drinking water and/or wastewater.

Aspects of the invention provide porous carbon material, e.g., JSAC from mainly or exclusively jute stick, generally using $NaHCO_3$ as the activation agent. Such JSAC may be used for $Pb^{2+}$ removal from aqueous solutions and/or fluid suspensions (including gases). Aspects of the invention provide carboxylation by acid treatment. Carboxylate-functionalized jute stick activated carbon (JSAC-COO$^-$) can be used in flow-based and/or batch treatments at varied $Pb^{2+}$ (and/or other metal) concentrations, e.g., at least 0.001, 0.005, 0.01, 0.025, 0.05, 0.1, 0.25, 0.5, 1, 2.5, 5, 7.5, 10, or 25 mg/L and/or up to 500, 400, 300, 250, 200, 150, 125, 100, 75, 50, 25, 10, 5, 2.5, or 1 mg/L, at varied pHs, e.g., at least 1, 2, 3, 3.5, 4, 4.25. 4.5, 5, 5.5, 6, 6.5, or 7.0 and/or up to 9 8.5, 8, 7.5, 7.25, 7, 6.75, or 6.5, at varied temperature, e.g., (ambient) and/or at least 1, 2.5, 5, 10, 12.5, 15, 17.5, 20, 22.5, 25, or 27° C. and/or up to 50, 45, 40, 35, 30, 27.5, 25, 22.5, 20, 17.5, or 15° C., and/or at varied contact periods, e.g., at least 0.5, 1, 2.5, 5, 7.5, 10, 15, 30, 45, or 60 minutes and/or up to 180, 150, 120, 105, 90, 75, 60, 55, 50, 45, 40, 35, or 30 minutes. Aspect of the invention provide formulations including varied amounts of JSAC and/or JSAC-COO$^-$ to modify the adsorption kinetics of adsorbents, particularly in removing $Pb^{2+}$ from aqueous solutions, and/or adjusting the degree of carboxylation of the activated carbon to modify $Pb^{2+}$ removal.

EXAMPLES

MATERIALS: Jute sticks were collected from Mominpur, Jessore (Bangladesh) having main constituents in the jute fibers of 58 to 63 wt. % α-cellulose, 20 to 22 wt. % hemicellulose, and 12 to 14 wt. % lignin. Table 1 shows the physical and chemical characteristics of jute stick.

TABLE 1

| Jute stick properties | | |
|---|---|---|
| | Type | Quantity |
| Bulk density (kg/m$^3$) | | 178.84 |
| Gross calorific value (MJ/kg) | | 17.32 |
| Proximate analysis (%) | Volatile | 78.40 |
| | Fixed carbon | 11.80 |
| | Moisture | 9.02 |
| | Ash | 0.78 |
| Ultimate analysis (%) | C | 44.94 |
| | H | 4.38 |
| | N | |
| | O | 49.90 |

The non-cellulosic constituents in jute sticks are 37 to 42 wt. % while the chemical composition is similar to jute fiber. Jute stick contains higher lignin, ca. 23.5 wt. %, and lower α-cellulose, ca. 40.8 wt. % than jute fiber.

Sodium bicarbonate ($NaHCO_3$), hydrochloric acid (HCl, 37 w/v %), sulfuric acid ($H_2SO_4$), nitric acid ($HNO_3$), Pb standard solution (1000 parts per million (ppm), and other chemicals, were obtained from Sigma-Aldrich. Deionized water was obtained from a Barnstead Nanopure water purification system (Thermo Scientific, 7148, USA).

INSTRUMENTATION: Field-emission scanning electron microscopy (FE-SEM) images of the carboxylated JSAC (JSAC-COO$^-$) were taken by an TESCAN LYRA 3 FE-SEM (Czech Republic). An Oxford Instruments Xmass detector equipped with the FE-SEM was used for the determination of enemy dispersive x-ray spectra (EDS). An iHR320 with CCD detector, HORIBA, Raman spectrometer equipped with green laser (300 mW) excitation wavelength ($\lambda_o$=532 nm), was used for the study and detection of graphite structure in the JSAC-COO$^-$. X-ray diffraction (XRD) analyses and chemical analysis of JSAC-COO$^-$ were obtained by a high-resolution Rigaku Ultima IV x-ray diffractometer equipped with Cu-K (alpha) radiation and an x-ray photoelectron spectroscope (XPS) equipped with an Al K-alpha micro-focusing x-ray monochromator (ESCALAB 250Xi XPS Microprobe, Thermo Scientific, USA), respectively. A Perkin Elmer (16F PC FTIR) Fourier-transform infrared spectrometer (FT-IR) was used for recording IR spectra. A Micromeritics ChemiSorb 2750 apparatus was used for the Brunauer-Emmett-Teller (BET) and Barrett-Joyner-Halenda (BJH) analyses to measure the surface area and pore size of the JSAC-COO$^-$. A Powersonic 603 ultrasonic cleaner was used for sonication. The pH of the buffer solutions was recorded using a dual channel Fisher Scientific XL60 pH meter.

PREPARATION OF JUTE STICK ACTIVATED CARBON (JSAC): Jute sticks were cut into small pieces with chopper and cleaned with deionized water. The cleaned jute stick pieces were dried at 110° C. in an oven for 24 hours. The dried jute stick pieces were powdered with a household blender. The powder was mixed with NaHCO$_3$ at a mass ratio of 1:4 using the household blender. The mixture was placed into the middle of a tube furnace and heated at 850° C. for 5 hours under nitrogen atmosphere. The exemplary preparative scheme is represented in FIG. 1. The heating rate was 5° C. per minute and the cooling rate was 10° C. per minute. The carbon was washed twice with deionized water, then with 0.5 M HCl, and dried. The product (JSAC) was dried at 60° C. in a vacuum oven to constant weight.

Figure 2:
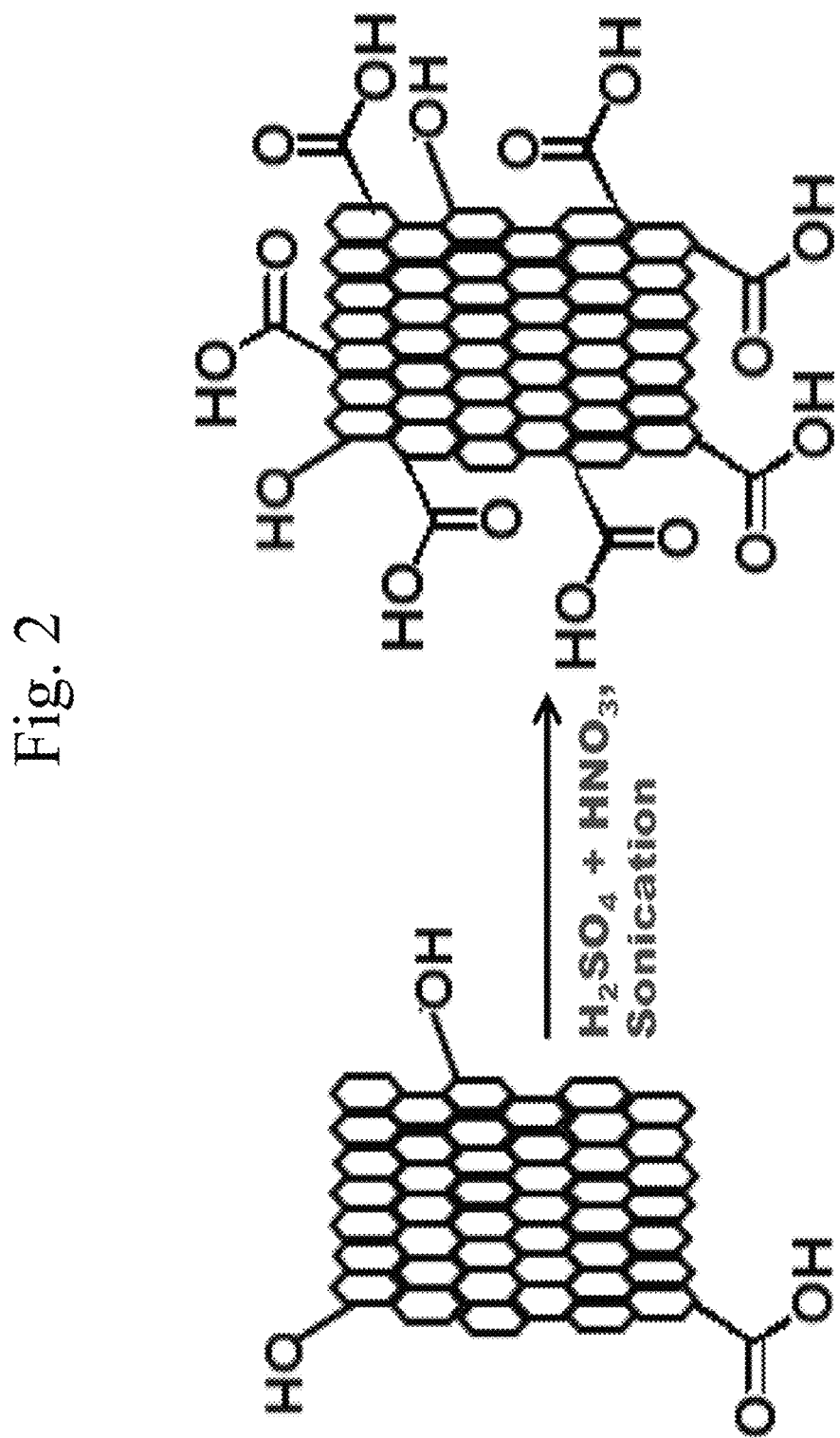
FIG. 2 shows a representation of the carboxylation of porous activated carbon as may be used within the scope of the invention.

CARBOXYLATION OF JSAC: A representation of an exemplary reaction scheme for the carboxylation of jute stick activated carbon (JSAC) is depicted in FIG. 2. A total of 2.4 g of porous JSAC, prepared as described above, was added to 1.6 L mixed solution of concentrated H$_2$SO$_4$ and HNO$_3$ (3:1 by volume), and the solution was transferred to an ultrasonicator. Following sonication for 5 hours to generate carboxylic groups, the reaction mass was diluted with deionized water. The resultant diluted mixture was left standing for 8 hours to form separate layers between the carboxylated carbon and mother liquor. Thereafter, the upper layer (mother liquor) was decanted. The dilution and decantation procedure was repeated six times. After filtering and washing with deionized water, the carboxylate functionalized JSAC (JSAC-COO$^-$) was dried at 60° C. for 24 hours.

Figure 3:
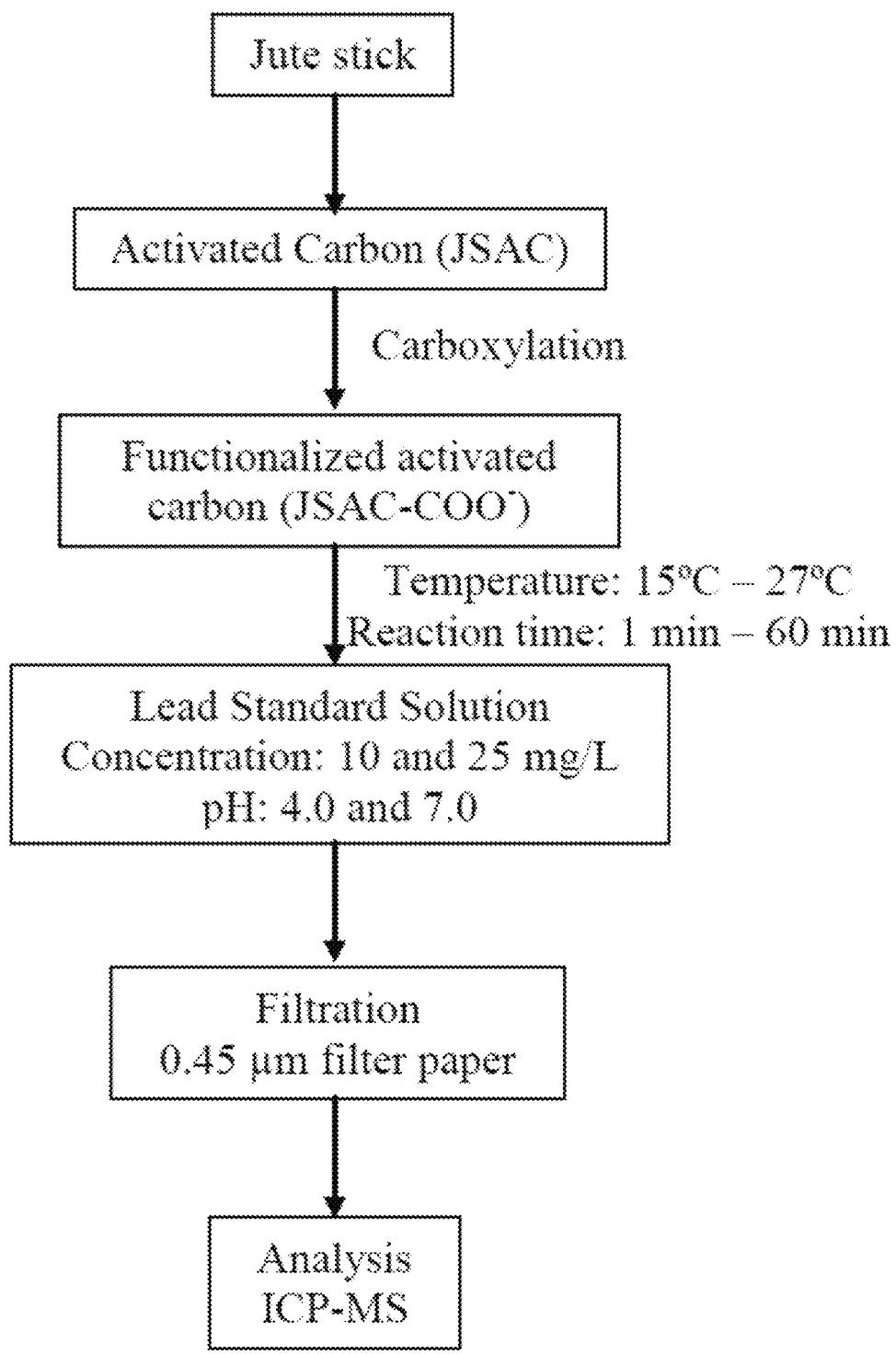
FIG. 3 shows a flow chart with an exemplary summarized batch experiment, employing conditions which may be used in aspects of the invention.

SAMPLE PREPARATION AND ANALYSIS: FIG. 3 shows a flow chart of exemplary batch experiments as performed herein. A Pb$^{2+}$ standard solution, 1000 parts per million (ppm) Pb$^{2+}$ in 0.5 M HNO$_3$ from Pb(NO$_3$)$_2$, was purchased from Sigma Aldrich and used as a stock solution to prepare the diluted solutions of the sample concentrations, i.e., 10 and 25 mg/L. The pH of the solutions was adjusted to 4.0 and 7.0 using 0.1 M NaOH and 0.1 M HNO$_3$. The temperature was controlled using the temperature controlled oil bath. JSAC-COO$^-$ (20 mg) was added into 20 mL of Pb$^{2+}$ solution with Pb$^{2+}$ concentrations in the range of 10 to 25 mg/L in a screw cap glass vial. The upper limit Pb$^{2+}$ concentration of 25 mg/L was selected according to Patterson, J. W. *Industrial Wastewater Treatment Technology*. 2nd ed., Butterworth: Stoneham M A, 1985, which is incorporated by reference herein in its entirety. The range of concentrations can be increased depending on the Pb$^{2+}$ concentrations in the aqueous solution. The solutions were stirred at 200 rpm and the sorption reactions were allowed for 1, 5, 10, 15, 30, and 60 minutes prior to filtration using 0.45 µm filter paper.

The filtered Pb$^{2+}$ samples were analyzed using an ICP-MS XSERIES-II inductively coupled plasma-mass spectrometer (ICP-MS) following Method 6020A of the United States Environmental Protection Agency (US EPA 1998). The ICP-MS was calibrated using a blank and four different concentrations of Pb(II). The analysis was replicated three times and averages were taken as the residual concentrations of Pb$^{2+}$. The detection limit of ICP-MS is 0.05 parts per billion (US EPA 1998).

The JSAC, prior to carboxylation, was used for removing Pb$^{2+}$ with various concentrations (0.1 to 10 ppm) of Pb$^{2+}$ to analyze the effect of the carboxylic acid functionalization. The percent removal efficiencies of Pb$^{2+}$ were low, i.e., from 25 to 40%, although the morphologies of the JSAC and JSAC-COO$^-$ were similar. The carboxylation of JSAC improved the Pb$^{2+}$ removal efficiencies significantly. The presence of macro- and mesopores in JSAC-COO$^-$, increased its porosity compared to JSAC, may have increased the binding sites (—COO$^-$) for Pb$^{2+}$ and increased the removal efficiency of Pb$^{2+}$.

The 615.3 m$^2$/g surface area of the exemplary JSAC-COO$^-$ samples prepared herein, listed below in Table 3, may contribute to improved performance in removing Pb$^{2+}$ from aqueous solutions. The BET surface area of JSAC-COO$^-$ may be at least 575, 585, 590, 595, 600, 605, 610, 615, 620, or 625 m$^2$/g and/or up to 675, 665, 655, 650, 645, 640, 635, 630, 625, 620, or 615 m$^2$/g. The adsorption capacity of JSAC-COO$^-$ was up to 25.0 mg/g within 30 minutes of contact time, while the maximum adsorption capacity is likely to be higher, e.g., up to 26, 27, 27.5, 28, 29, 30, 31, 32, 32.5, 35, 37.5, 40 mg/g or more. Approximately 1.0 g/L of JSAC-COO$^-$ removed 99.8% of Pb$^{2+}$ from an initial concentration of 25 mg/L in 15 minutes of contact time. For comparison, apricot stone activated carbon (AAC) has been reported to have a BET surface area of 393.2 m$^2$/g and a maximum adsorption capacity of 21.38 mg/g. Sulfur functionalized AAC (SAC) has been reported to have a maximum adsorption capacity of 29.44 mg/g. Coconut shell activated carbon (CSC) has been reported to have a BET surface area of 265.96 m$^2$/g and a maximum adsorption capacity of 26.50 mg/g. In 120 minutes of contact time, the percent removal by CSC was 92.5% for an initial 10 mg/L Pb$^{2+}$ concentration and 91% for an initial Pb$^{2+}$ 20 mg/L concentration. Phosphoric acid (H$_3$PO$_4$)-treated sea-buckthorn stone activated carbon (PASBAC) has been reported to have a maximum uptake capacity of 23.4 mg/g and a removal of 98.5%, while the ZnCl$_2$-treated sea-buckthorn stone activated carbon (ZCSBAC) has been reported to have a maximum uptake capacity of 22.05 mg/g; and a removal of 98.3%. The contact time for PASBAC (BET surface area of 1071 m$^2$/g and ZCSBAC (BET surface area of 829 m$^2$/g) was 40 minutes. The maximum adsorption capacity of multi-walled carbon nanotubes (MWCNT) has been reported to be 166 mg/g, though the use of carbon nanotubes in water treatment has been limited by high costs. The commercial price of MWCNT at Sigma Aldrich in 2019 was 129 USD/g. The adsorption capacity of JSAC-COO$^-$ was therefore comparable to many known adsorbents, as seen in Table 2, though the contact time for JSAC-COO$^-$ has been determined herein (detailed below) to be much lower than the other adsorbents, which is an advantage over the other adsorbents.

TABLE 2

Comparative efficiency of JSAC-COO$^-$ with other activated carbons.

| Adsorbent | Maximal capacity (mg/g) |
| --- | --- |
| SAC | 29.44 |
| Apricot stones AC | 21.38 |
| GAC with bacteria | 26.40 |
| Carbon nanotubes | 12.41 |
| Date stones AC | 19.64 |
| Coconut shell AC | 26.50 |
| PASBAC | 23.4 |

TABLE 2-continued

Comparative efficiency of
JSAC-COO⁻ with other activated carbons.

| Adsorbent | Maximal capacity (mg/g) |
| --- | --- |
| ZCSBAC | 22.05 |
| Pine cone AC | 27.53 |
| JSAC-COO⁻ | >25 |

Referring now to the drawings, wherein like reference numerals designate identical or corresponding parts throughout the several views.

FIG. 1 shows a schematic procedure for a suitable preparation of jute stick activated carbon (JSAC) as described in the Examples. FIG. 2 shows a theoretical representation of an exemplary reaction scheme for the carboxylation of JSAC. FIG. 3 shows a flow chart of exemplary batch experiments as performed herein.

Figure 4A:
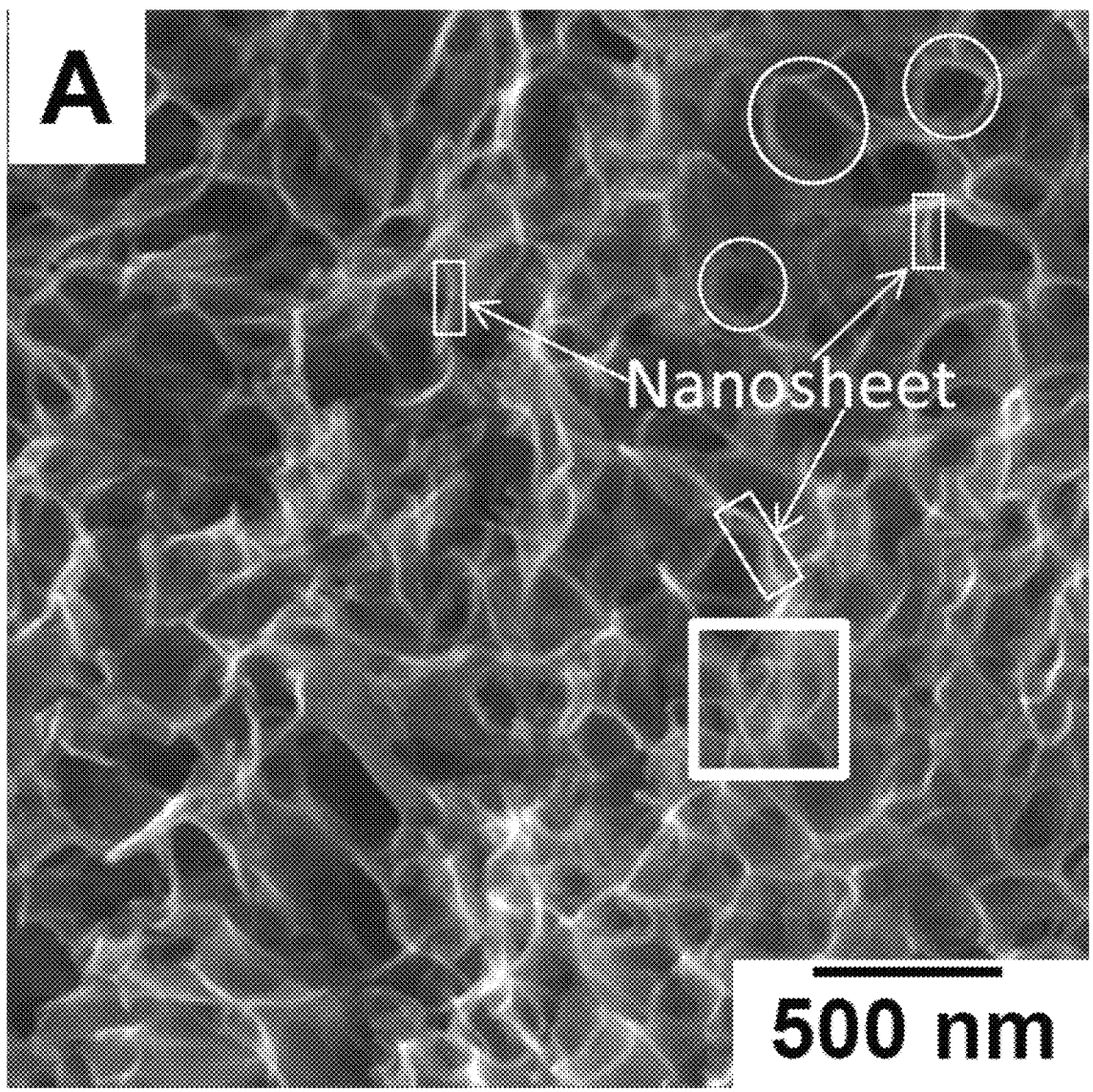
FIG. 4A shows a field emission scanning electron microscope (FE-SEM) Image of a JSAC-COO⁻ sample prepared as described herein on 500 nm scale.
Figure 4B:
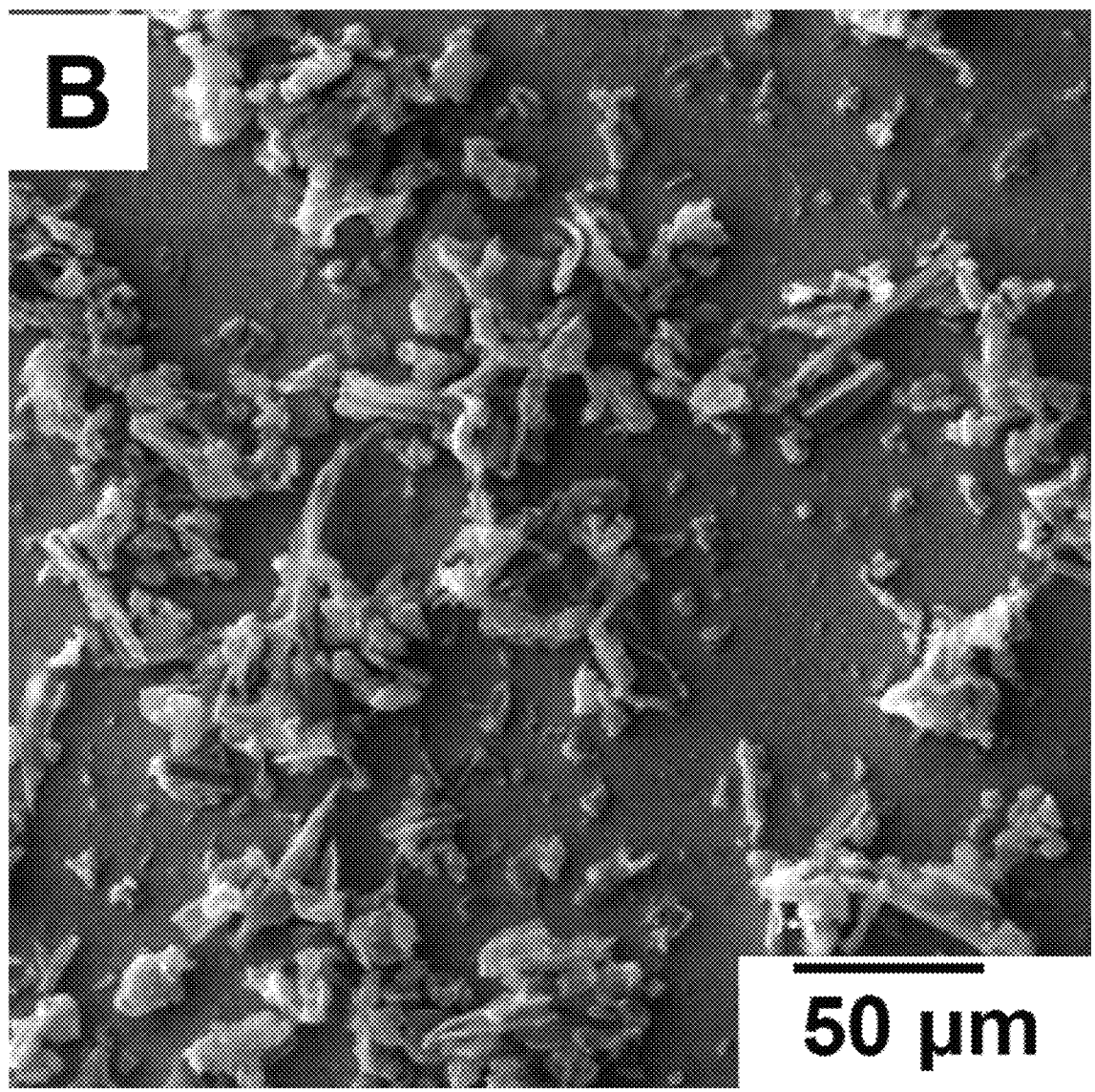
FIG. 4B shows an FE-SEM image of a JSAC-COO⁻ sample prepared as described herein on 50 μm scale.

FIGS. 4A and 4B show the FE-SEM images of the JSAC-COO⁻. FIG. 4B indicates the size (longest dimension) of carbon particles to be in the range of few μm to 60 μm, e.g., at least 1, 2, 2.5, 3, 4, 5, 7.5, 10, 15, 20, or 25 μm and/or up to 75, 70, 65, 60, 55, 50, 45, 40, 35, 30, 25, 20, or 15 μm. The magnified view in FIG. 4A indicates that each micro particle is composed of numerous nanosheets. At least 50, 65, 75, 80, 85, 90, 95, 97.5, 99% or (substantially) all nanosheets may exist in regular arrangement with an extensive quantity of uniform size macropores for inventive JSAC-COO⁻. Some nanosheets are identified by rectangular boxes and some macropores by circles in FIG. 4A. Uniform and large number of macropores increased the surface area of JSAC-COO⁻ significantly relative to JSAC. The unique architecture of nanosheets with large interlayer spacing is suitable for heavy metal removal.

Figure 4C:
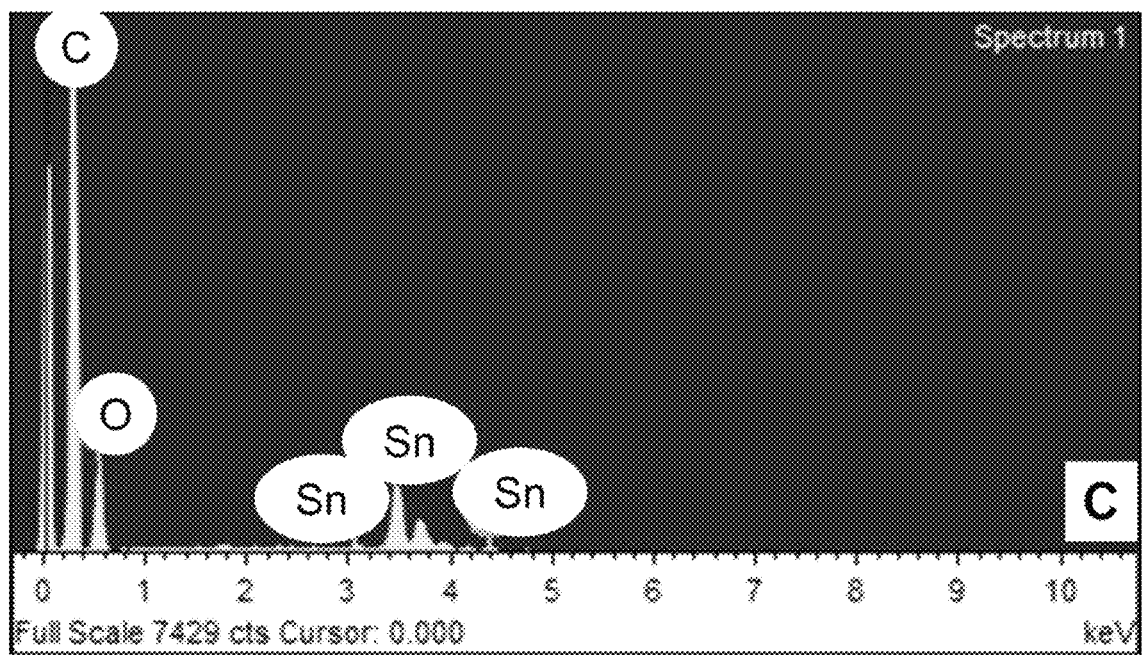
FIG. 4C shows an energy dispersive x-ray spectra (EDS) specter of the white marked area of FIG. 4A.

FIG. 4C shows an energy-dispersive X-ray spectroscopy (EDS) of a sample of JSAC-COO⁻ immobilized on fluorine doped tin oxide (FTO), indicating the presence of C, O and Sn, as expected for JSAC-COO⁻ on a substrate comprising tin oxide for recording the EDS spectrum. FIG. 4C indicates that the JSAC-COO⁻ is comprises or is composed of carbon and oxygen.

Figure 4D:
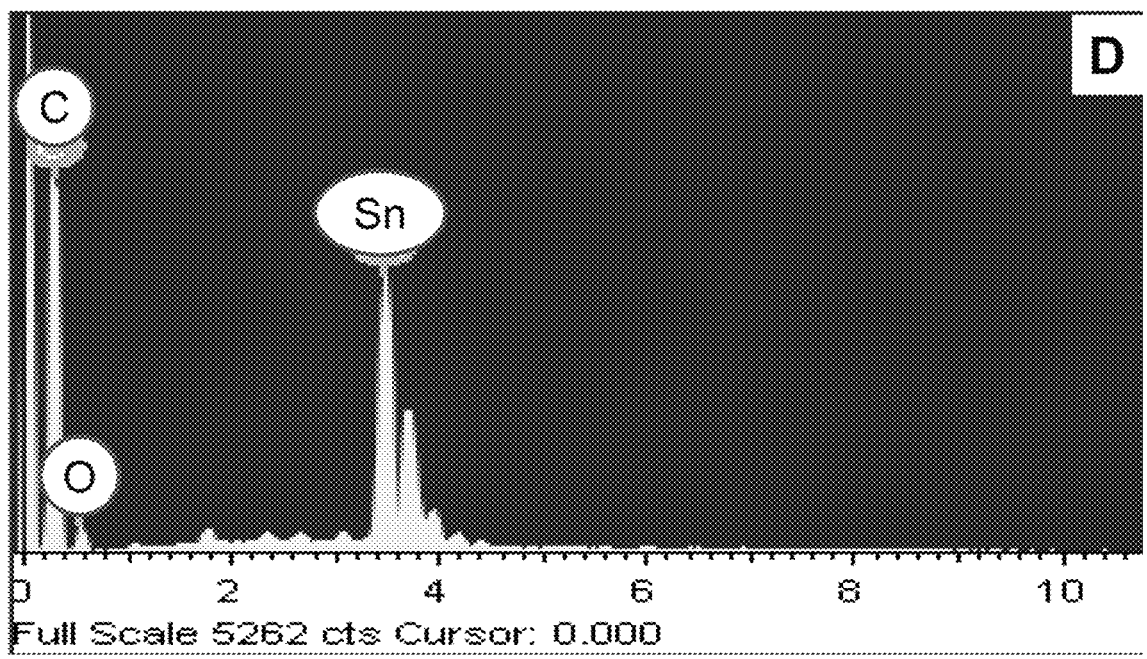
FIG. 4D shows an EDS spectrum of the JSAC (not carboxylated)
Figure 4E:
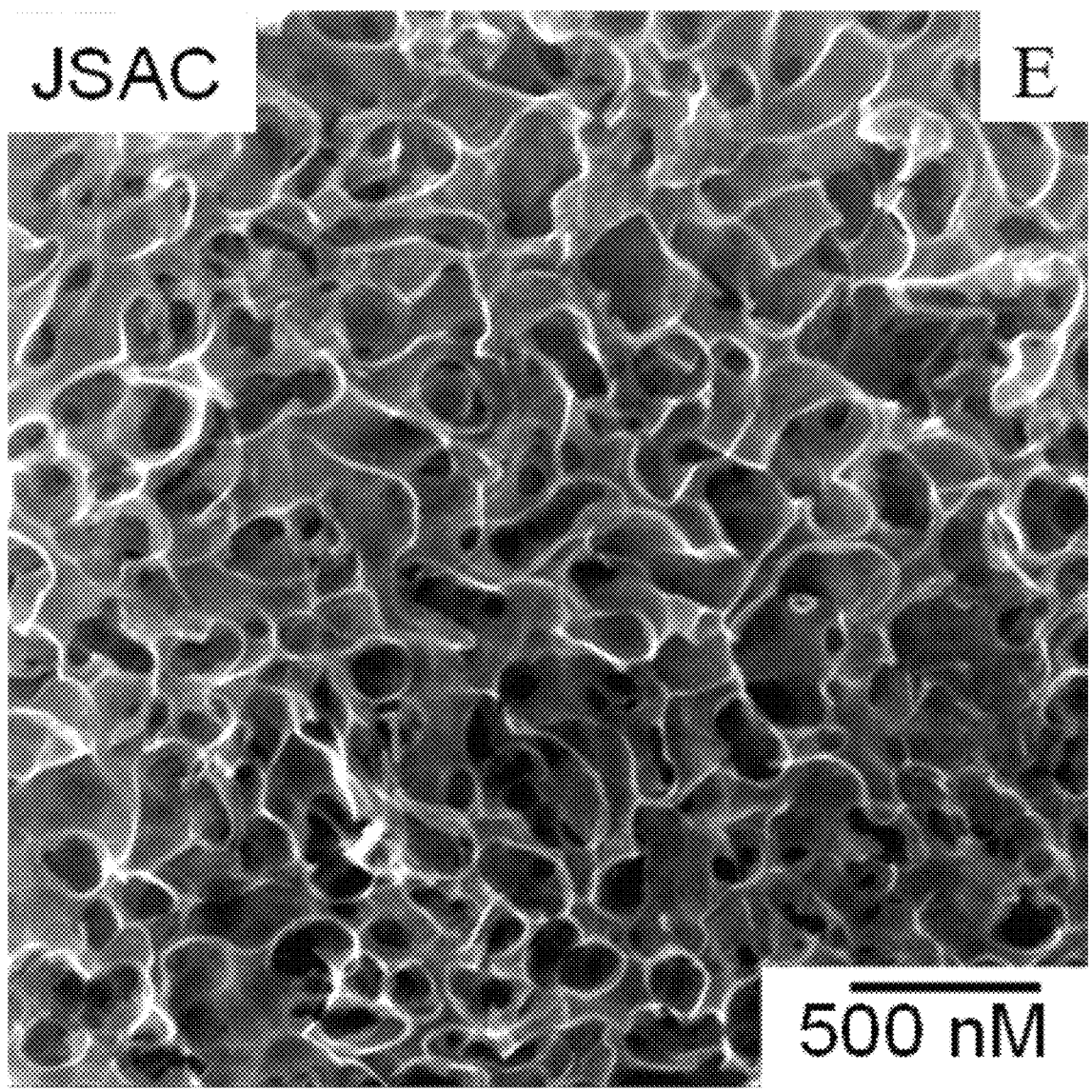
FIG. 4E shows an FE-SEM image of JSAC (not carboxylated) on 500 nm scale.

FIGS. 4D and 4E respectively show EDS spectrum and an SEM image of JSAC (uncarboxylated) for comparing morphology and chemical composition, the SEM images and EDS spectrum of JSAC were also recorded. The morphology and chemical composition of JSAC-COO⁻ and JSAC appear similar, as indicated by comparing FIGS. 4A and 4E. However, as evident by comparing FIGS. 4C and 4D, the ratio of oxygen to carbon peak intensity of JSAC-COO⁻ was higher than that of JSAC, indicating that additional oxygen molecules were introduced into the JSAC during carboxylation.

Figure 5A:
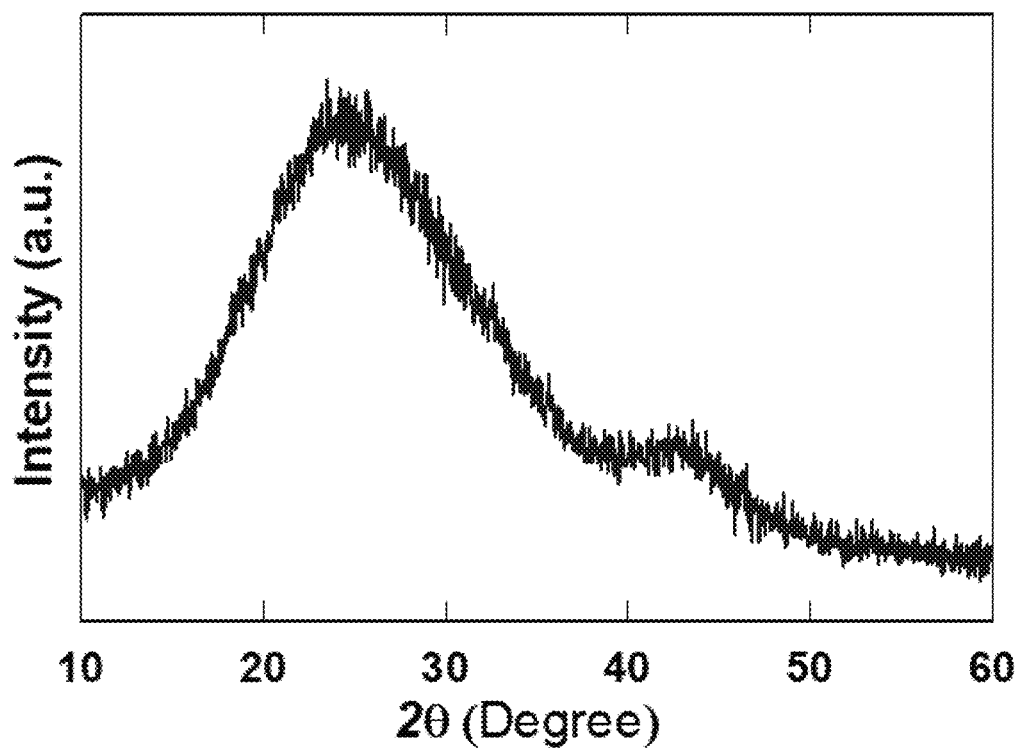
FIG. 5A shows an x-ray diffraction (XRD) spectrum of a JSAC-COO⁻ sample, prepared as described herein.

FIG. 5A shows an x-ray diffraction (XRD) spectrum of JSAC-COO⁻ at 850° C. All of the diffraction peaks in the XRD in FIG. 5A can be assigned to the porous graphitic framework (JCPDS no. 41-1487) with two broad peaks at around 2θ of 25° corresponding to the carbon (002) peak and around 2θ of 43° corresponding to the carbon (101) peak. The XRD pattern in FIG. 5A indicates that a graphite or graphite-like structure was obtained after carboxylation of JSAC. However, the broadening of the two peaks indicates a low degree of graphitization, i.e., small domains of coherent and parallel stacking of graphene.

Figure 5B:
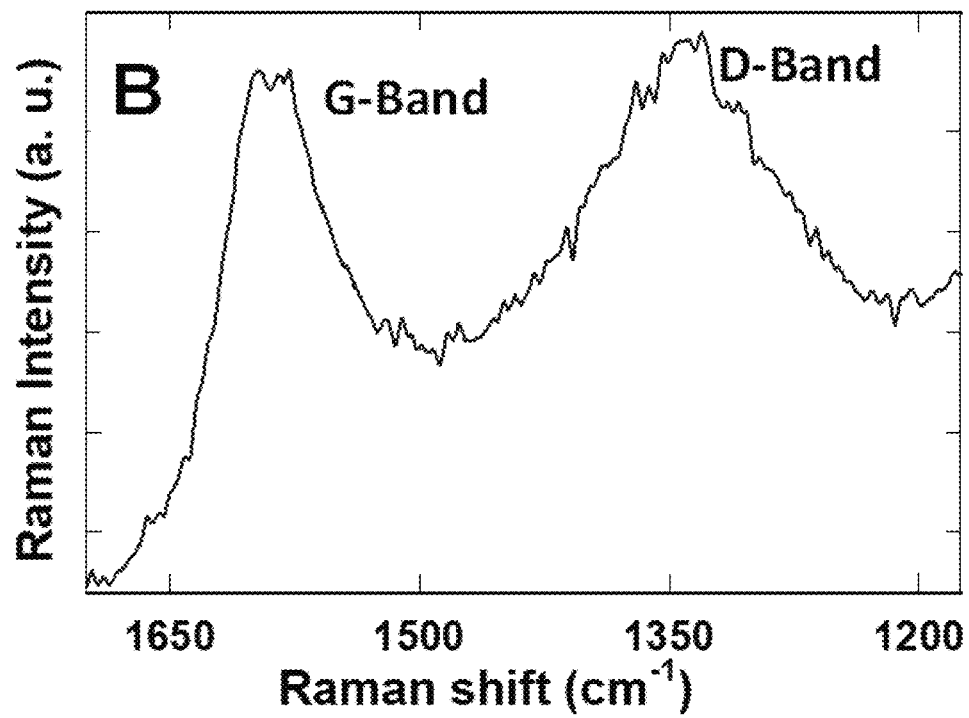
FIG. 5B shows a Raman spectrum of a JSAC-COO⁻ sample, prepared as described herein.

FIG. 5B shows a Raman spectrum of a JSAC-COO⁻ sample within the scope of the invention. The Raman spectrum consists of two broad peaks centered at around 1589 and 1335 $cm^{-1}$, which are respectively caused by the effects of graphitization (G) and defects (D). Moreover, the intensity of D-band is higher than the intensity of G-band, indicating that the JSAC-COO⁻ sample has a me defects and interspaces on the carbon surface.

Figure 6A:
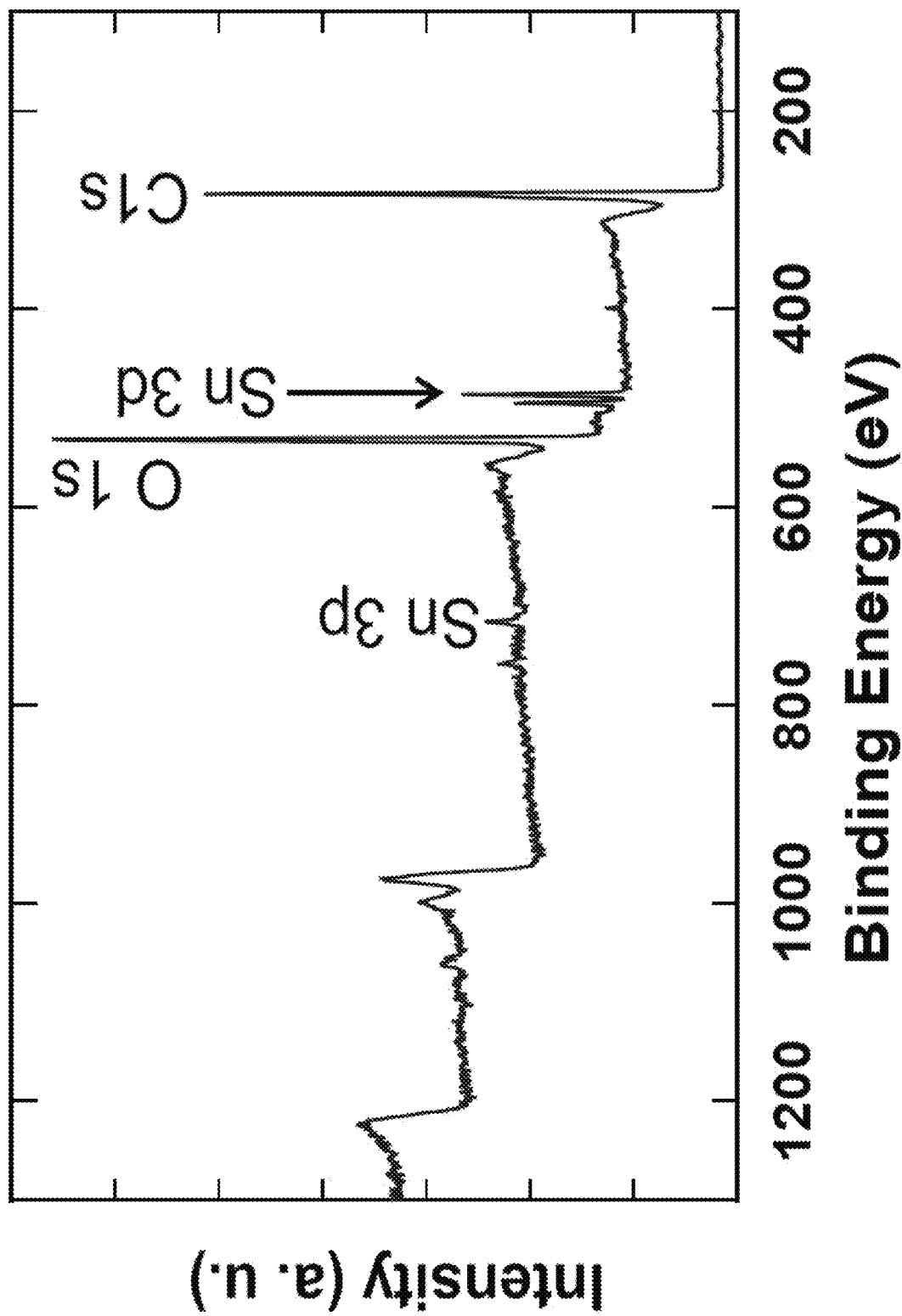
FIG. 6A shows an x-ray photoelectron spectroscope (XPS) survey spectrum of an exemplary JSAC-COO⁻ sample within the scope of the invention having three major peaks of carbon, oxygen, and tin.

FIG. 6A to 6D show evaluations of the functional groups of JSAC-COO⁻ using the X-ray photoelectron spectroscopy (XPS) and Fourier-transform infrared (FT-IR) measurements. FIG. 6A shows the XPS survey scan spectrum, indicating three major bands at approximately 284.60 eV representing C1s, 486.60 eV representing Sn3d, and 531.60 eV representing O1s. The peak for Sn is due to the use of fluorine doped tin oxide (FTO) substrate for developing JSAC-COO⁻ sample for XPS analysis. FIG. 6A is consistent with the EDS in FIG. 4C.

Figure 6B:
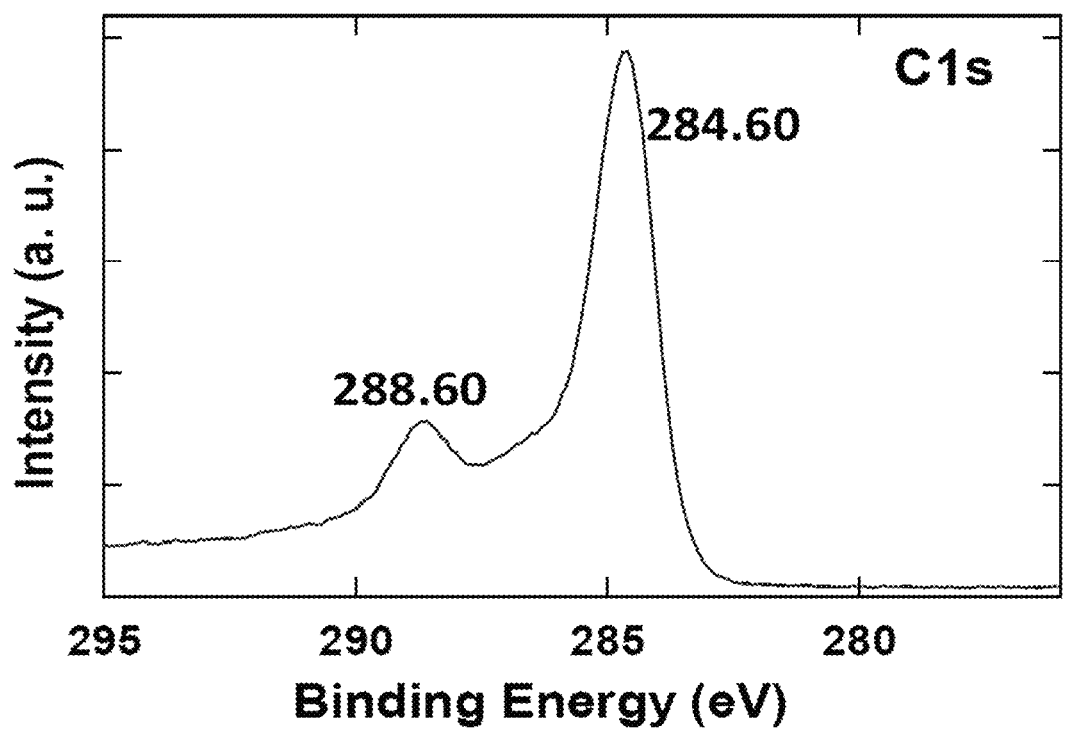
FIG. 6B shows a high resolution XPS spectrum of C1s zone of an exemplary JSAC-COO⁻ sample within the scope of the invention.
Figure 6C:
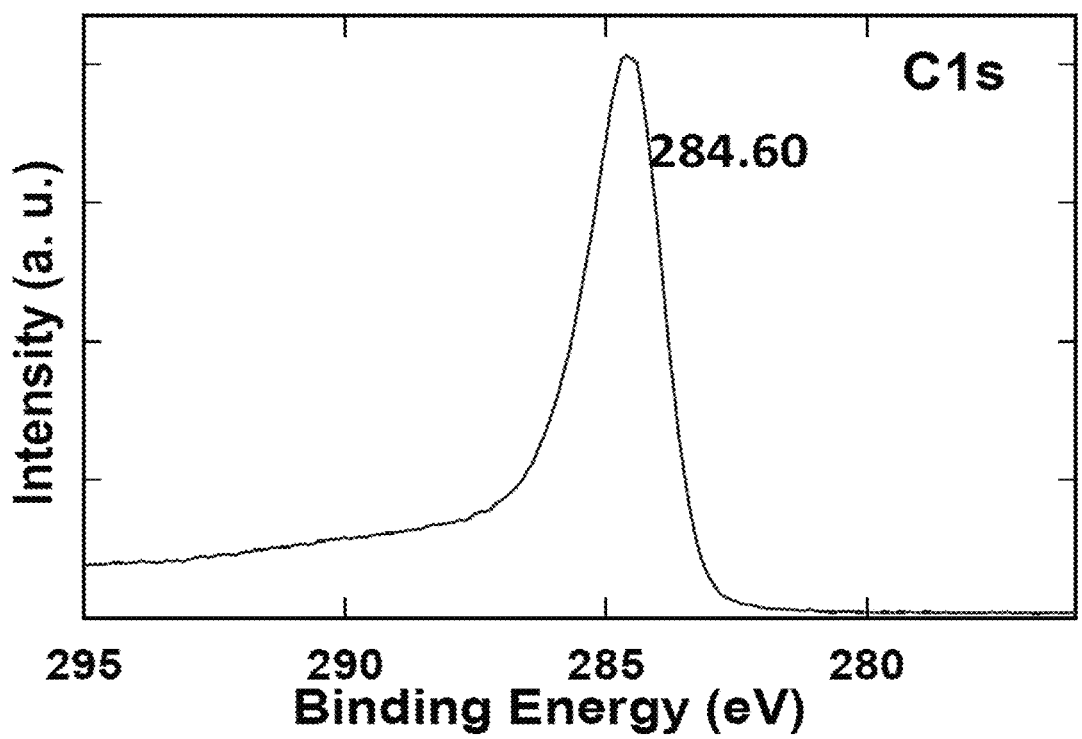
FIG. 6C shows a high resolution XPS spectrum of C1s zone of a JSAC sample (not carboxylated)

FIG. 6B shows the 1s core level spectrum having of two major peaks at around 284.60 and 288.60 eV, which are respectively associated with carbon in the states of C—C and ⁻O—C=O. The position and pattern of the peaks are consistent to C1s peaks of carboxylated carbon materials. To compare the functional groups, the XPS spectra of JSAC was also recorded. The survey spectrum of JSAC (not shown) indicates that a JSAC sample prepared as described herein is composed of carbon and oxygen like JSAC-COO⁻. As seen in FIG. 6C, however, the typical peak of ⁻O—C=O functional group at around 288.60 eV in the C1s core level spectrum of JSAC was absent while the peak at around 284.60 eV for C—C was present. The oxygenated functional groups in JSAC are described with the FTIR data below.

Figure 6D:
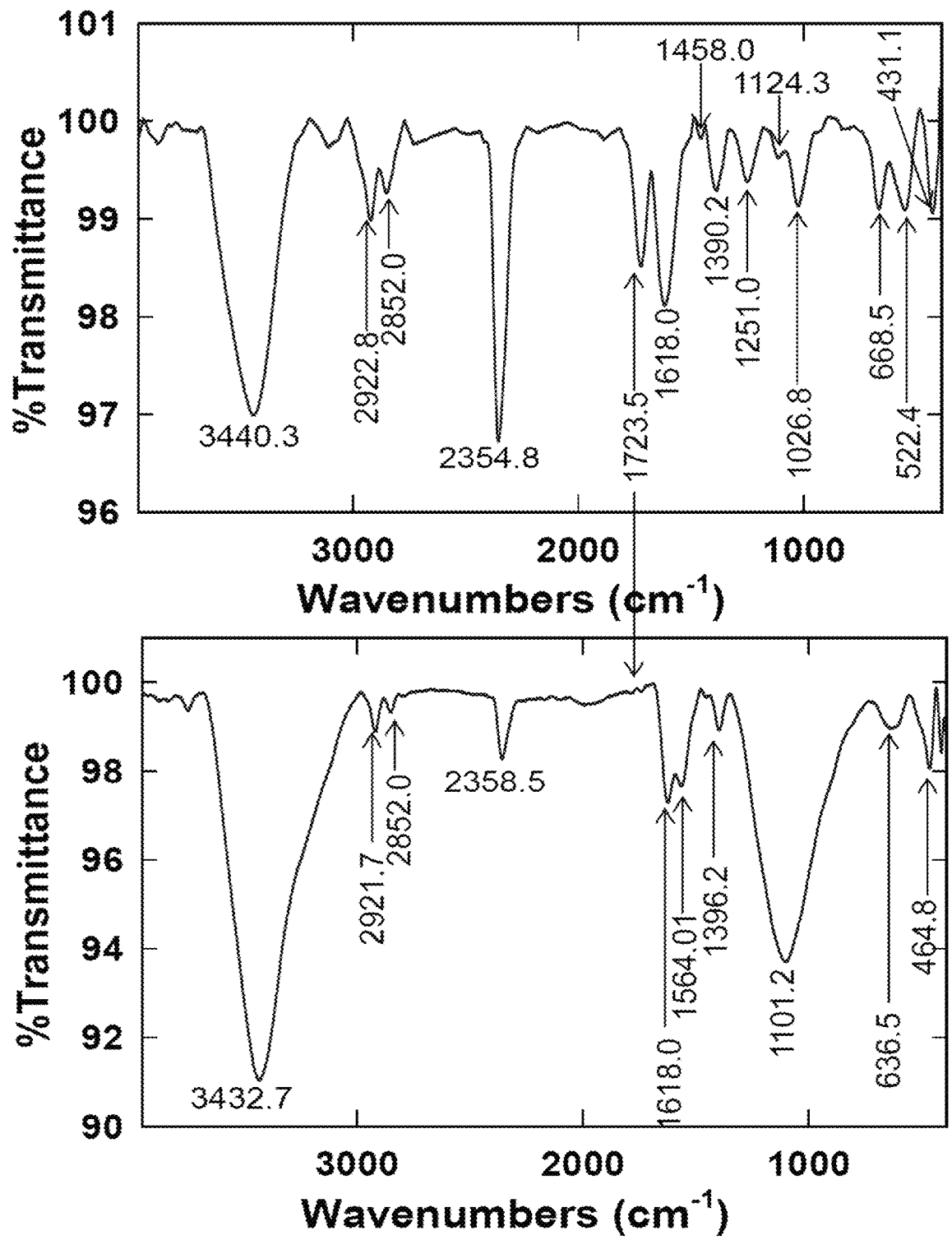
FIG. 6D shows Fourier Transform Infrared (FT-IR) spectra of exemplary JSAC-COO⁻ (above), prepared as described herein, versus JSAC (below)

FIG. 6D shows an FT-IR spectrum of JSAC-COO⁻ (above) juxtaposed with that of JSAC (below). Characteristic absorption bands at 3866.2, 3440.3, 2922.8, 2852.0, 2354.8, 1723.5, 1618.0, 1458.0, 1390.2, 1251.0, 1124.3, 1026.8, 668.5, 522.4, and 431.1 $cm^{-1}$ indicated the carbon materials containing several functional groups in the upper spectrum. The broad peak at 3440.3 $cm^{-1}$ indicates the presence of —OH group, which is primarily a characteristic peak of carboxylic functionality. An absorption peak at 1724 $cm^{-1}$ in the upper spectrum (JSAC-COO⁻) was assigned to C=O stretch of COOH in JSAC-COO⁻, while the symmetric and antisymmetric stretching of COO⁻ appeared at 1618 and 1458 $cm^{-1}$, respectively. In addition, the peaks appeared at 1458.0 and 1026.8 $cm^{-1}$ could be assigned to vibration of carboxylic acids. Besides, the peaks at 2922.8, and 2852.0 $cm^{-1}$ suggested the presence of C—H functional groups in JSAC-COO⁻.

Characteristic absorption bands of JSAC in the lower spectrum of FIG. 6D at 3750, 3440, 2922, 2852, 2358, 1618, 1564, 1396, 1101, 636 and 465 $cm^{-1}$ likewise indicate that the carbon materials containing several functionalities. The broad absorption at 3433.3 $cm^{-1}$ indicated the presence of —OH group. The peaks at 2922, 2852 $cm^{-1}$ suggested the presence of C—H groups, while the peaks at 1618, 1564 $cm^{-1}$ can be assigned to C=C stretching. In addition, the peaks at 1101 $cm^{-1}$ may indicate the presence of a C—O functional group. As seen in the lower spectrum, indicated by an arrow across the upper and lower spectra, the absorption peak at 1724 $cm^{-1}$ was absent in JSAC (below), unlike for JSAC-COO⁻, which is related to C=O stretch of COOH. This indicates that the JSAC was successfully functionalized with carboxylic groups in the JSAC-COO⁻ sample (above). These findings corroborate the XPS results in FIG. 6A to C.

Figure 7A:
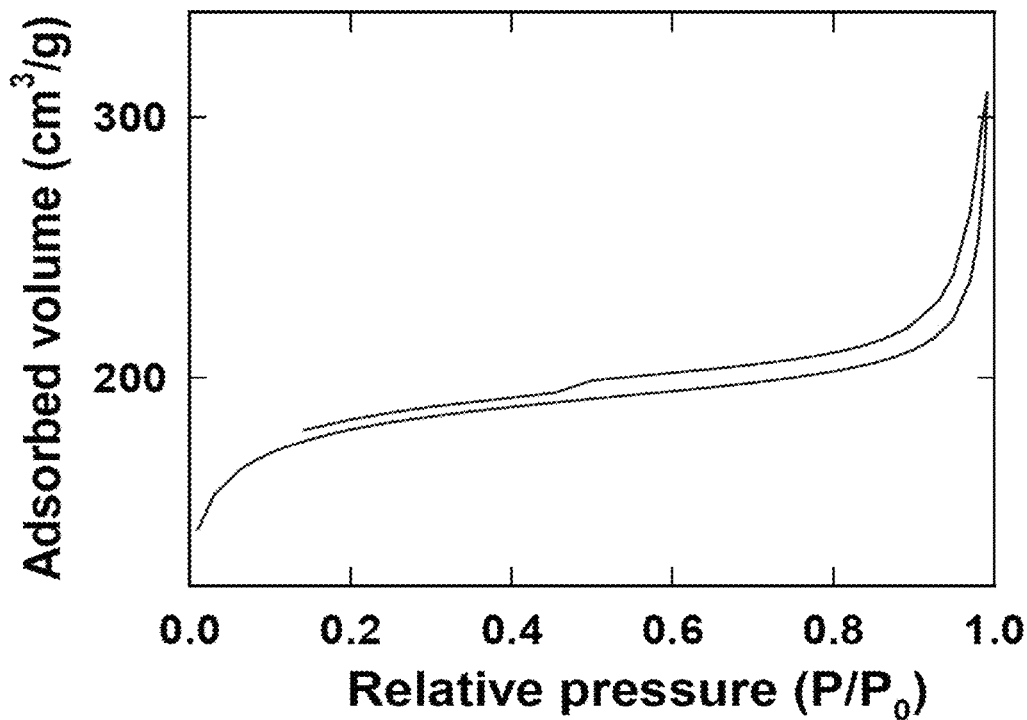
FIG. 7A shows a Brunauer-Emmett-Teller (BET) nitrogen ($N_2$) adsorption-desorption isotherm of an exemplary sample of JSAC-COO⁻, prepared as described herein.

FIG. 7A shows the nitrogen adsorption-desorption isotherms for JSAC-COO⁻. The Brunauer-Emmett-Teller (BET) analysis indicated a type II adsorption-desorption isotherm with a high nitrogen adsorption-desorption capacity. The sample in FIG. 7A shows a broader hysteresis loop from $P/P_0$ of 0.4 to $P/P_0$ of 1, indicating the presence of mesopores. An increase of hysteresis loop in the high relative pressure range, i.e., $P/P_0$ of 0.80 to 1.00, indicates the presence of macropores. The BET surface area of the JSAC-COO⁻ nanosheet sample was found to be 615.3 m²/g, e.g., at least 575, 580, 585, 590, 595, 600, 605, 610, 612.5, 615, or 617.5 m²/g and/or up to 650, 645, 640, 635, 630, 625, 622.5, 620, 617.5, 615, or 612.5 m²/g. The total pore volume of the JSAC-COO⁻ nanosheet samples was found to be 0.3677 cm³/g, e.g., at least 0.30, 0.31, 0.32, 0.325, 0.33, 0.335, 0.34, 0.345, 0.35, 0.355, 0.36, 0.365 cm³/g and/or up to 0.45, 0.425, 0.4, 0.39, 0385, 0.38, 0.375, 0.37, 0.365 cm³/g. The BET surface area of JSAC-COO⁻ was found to be lower than that of JSAC prior to functionalization (1142.4 m²/g). The oxidation of carbon materials with acid can increase the surface hydrophilicity via the insertion of carbon-oxygen polarity, occupying a large fraction of the surface. The large amounts of carboxylate groups appears to have reduced the adsorption of non-polar nitrogen molecules in the BET analysis, lowering the BET surface area. Table 3 presents the BET surface area before and after functionalization of few carbon materials. The surface area of JSAC-COO⁻ is higher than other carboxylated carbon materials, e.g., activated carbon from date leaves, carbon nanotubes, and graphene, as seen in Table 3.

TABLE 3

BET surface areas before and after carboxylation of different carbon materials

| No. | Carbon Material | Oxidizing agent | BET surface area (m²/g) | carboxylated BET surface area (m²/g) |
|---|---|---|---|---|
| 1 | Date palm leaflet AC | conc. HNO₃ | 823 | 33.8 |
| 2 | Multi-walled CNT | conc. HNO₃ | 170 | 130 |
| 3 | Multi-walled CNT | conc. H₂SO₄/HNO₃ | 298 | 266 |
| 4 | Vulcan XC72R | conc. HNO₃ | 241 | 167 |
| 5 | Multi-walled CNT | HNO₃/H₂O₂ | — | 194.4 |
| 6 | Single walled CNTs | reflux in 5M HCl | 55.2641 | 6.5824 |
| 7 | Jute stick AC | conc. H₂SO₄/HNO₃ | 1142.4 | 615.3 |

Figure 7B:
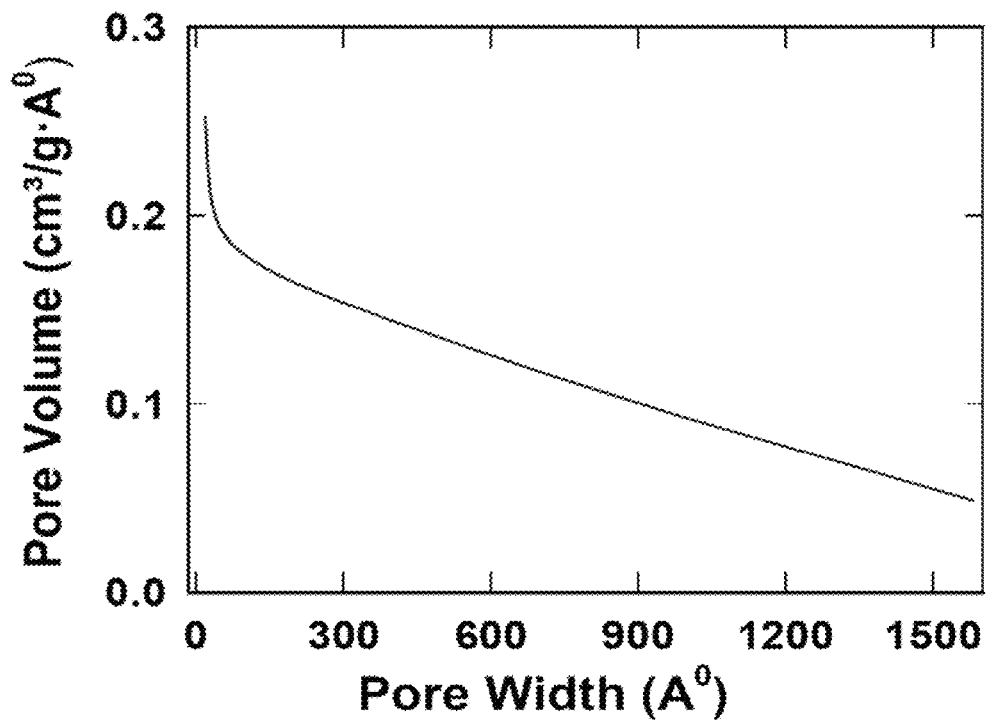
FIG. 7B shows corresponding. Barrett-Joyner-Halenda (BJH) pore-size distributions of the JSAC-COO⁻ in FIG. 7A.

FIG. 7B shows the Barrett-Joyner-Halenda (BJH) pore-size distribution of JSAC-COO⁻. The BJH pore-size distribution indicates a distribution of pore width from 1.7 to 150 nm, e.g., at least 0.5, 1, 1.25, 1.5, 1.75, 2, 2.5, 5, or 10 nm and/or up to 175, 165, 160, 155, 150, 145, 140, 135, 133, or 125 nm, with a BJH adsorption average pore width of 8.93 nm, e.g., at least 7.5, 7.75, 8, 8.25, 8.5, 8.75, 8.85, 8.9, 8.95, 9, 9.05, 9.1, or 9.25 nm and/or up to 10, 9.75, 9.5, 9.25, 9.15, 9.1, 9.05, 9, 8.95, or 8.9 nm. The range of pore size, average pore width, and type of the curve in FIG. 7B, indicate large fractions of mesopores and micropores in JSAC-COO⁻. Overall, the BET analysis confirms the presence of macro- and mesopores in addition to micropores in JSAC-COO⁻, which is reflected in microscopic analysis in FIG. 4. The combination of macro and mesoporous structure appears to increase the specific surface area, which may offer increased sites for ions mobility. In general, coexistence of macro- and mesopores leads to highly porous structure and large specific surface area while the carboxylic functional group plays a vital role for removal of heavy metals from drinking water. Consequently, the JSAC-COO⁻ should be for Pb²⁺ removal from drinking water.

Figure 8A:
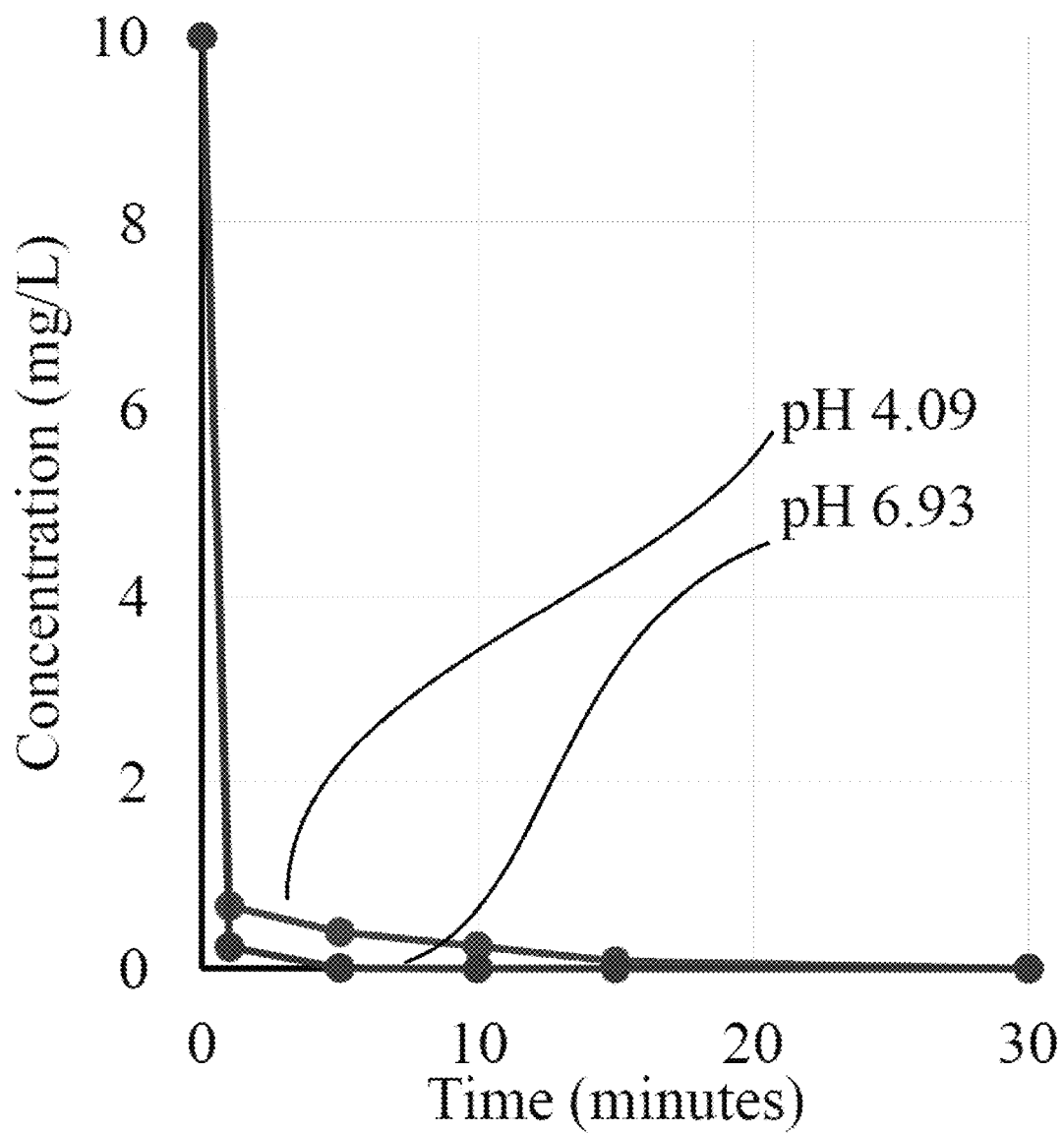
FIG. 8A shows a plot of the effect of contact time on $Pb^{2+}$ adsorption by an exemplary JSAC-COO⁻ sample at an initial $Pb^{2+}$ concentration of 10 mg/L and a temperature: 27° C.
Figure 8B:
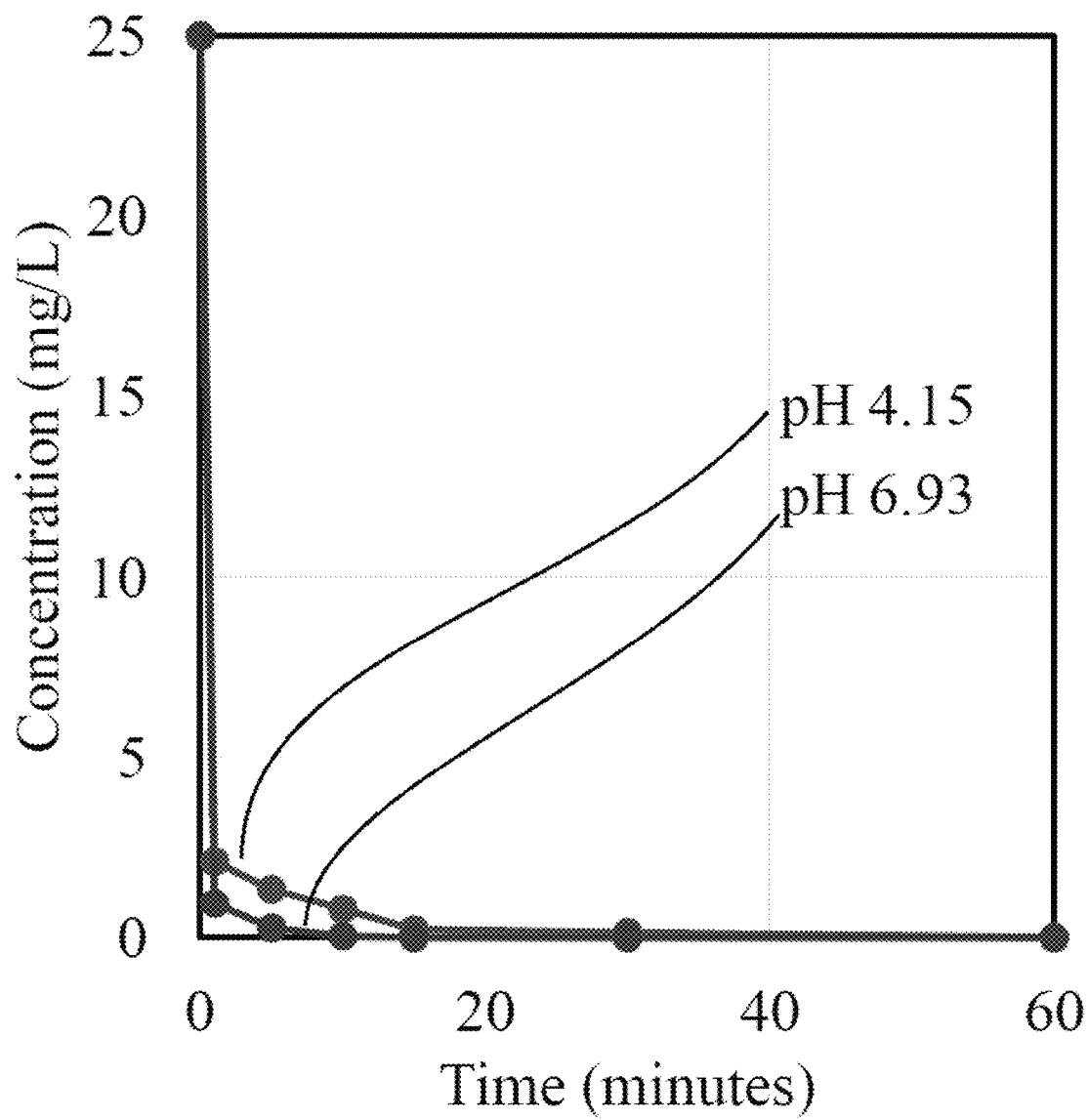
FIG. 8B shows a plot of the effect of contact time on $Pb^{2+}$ adsorption by an exemplary JSAC-COO⁻ sample at an initial $Pb^{2+}$ concentration of 25 mg/L and a temperature: 27° C.
Figure 8C:
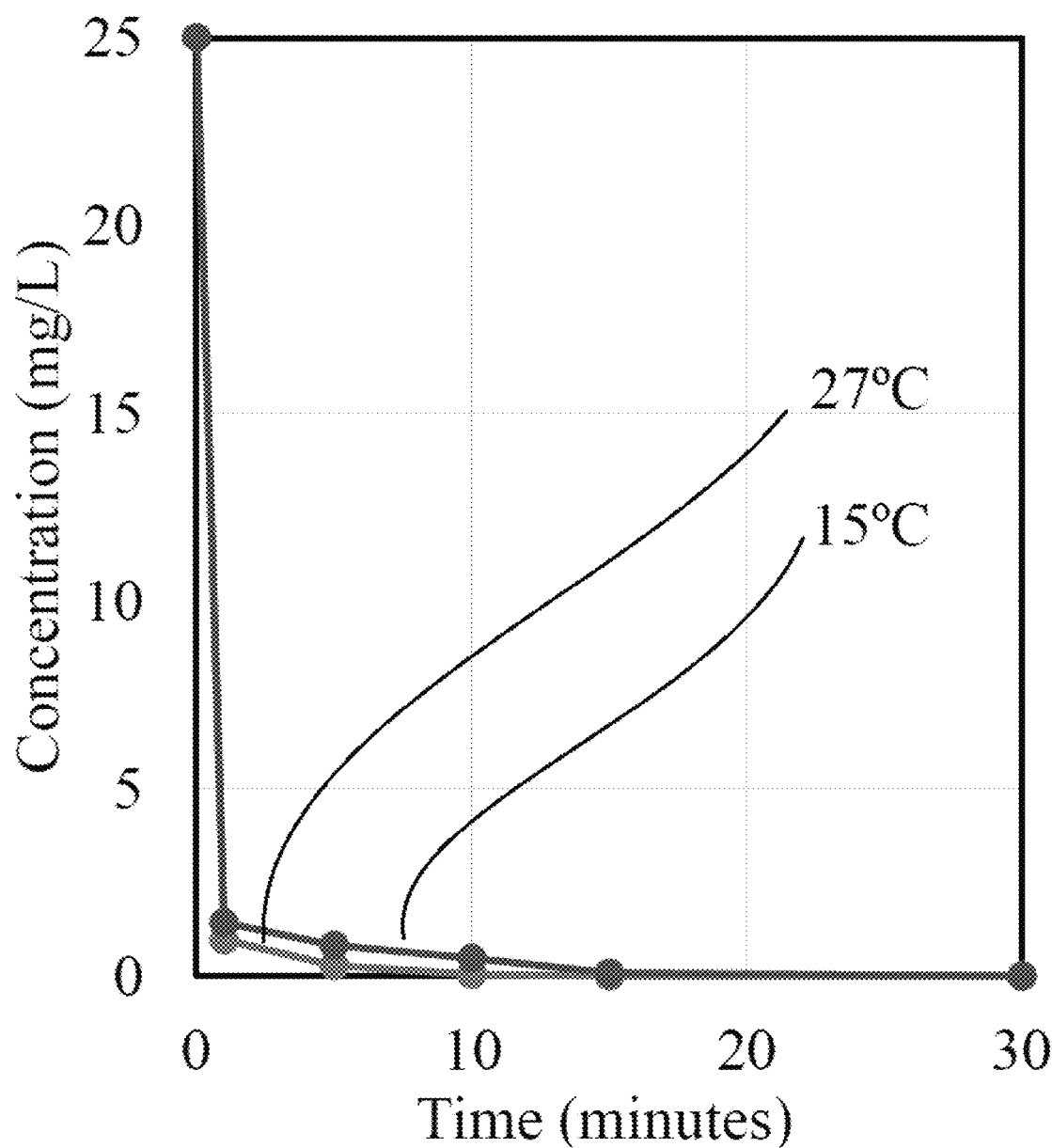
FIG. 8C shows a plot of the effect of contact time on $Pb^{2+}$ adsorption by an exemplary JSAC-COO⁻ sample at an initial $Pb^{2+}$ concentration of 25 mg/L and a pH of 6.93.
Figure 8D:
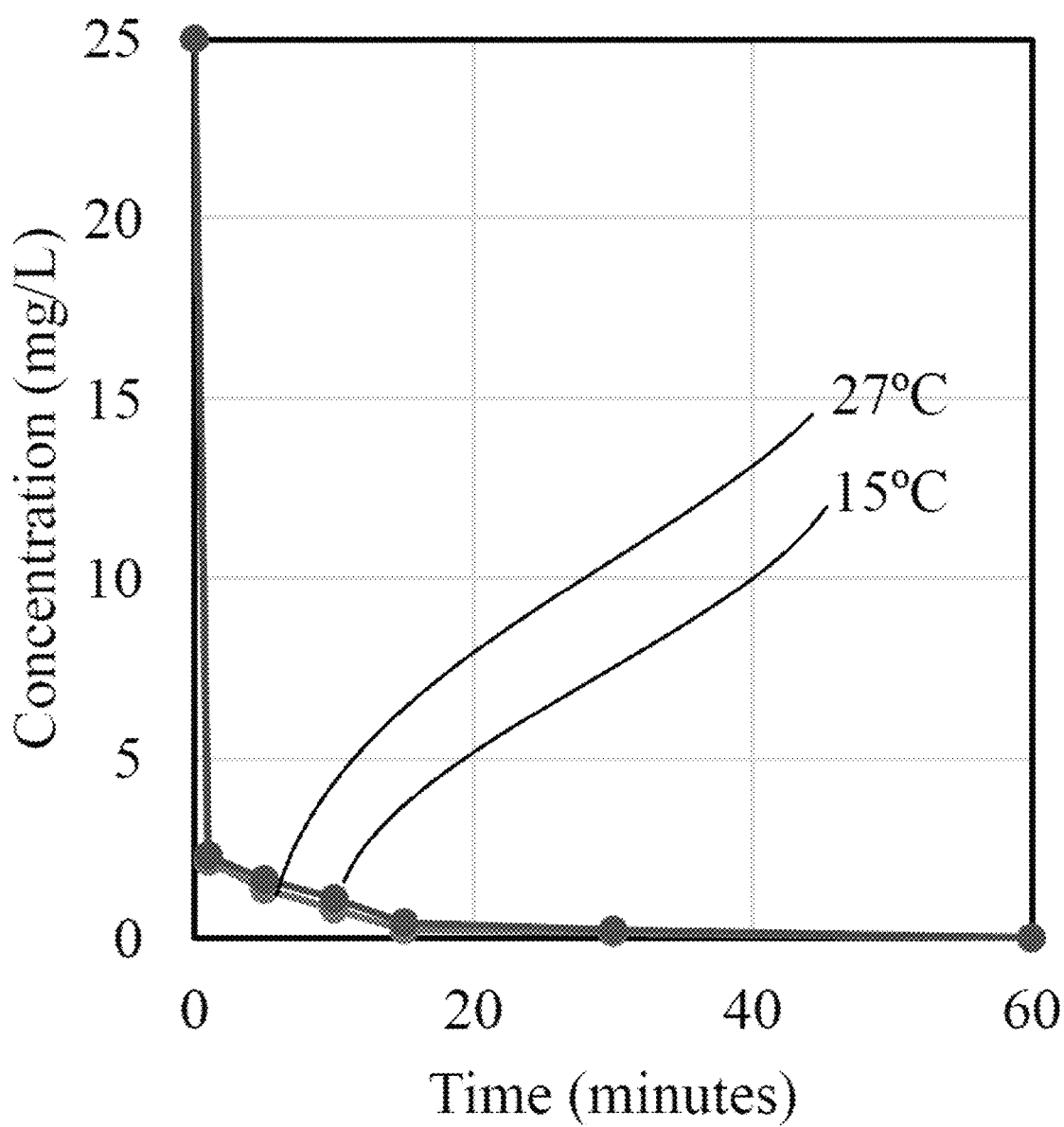
FIG. 8D shows a plot of the effect of contact time on $Pb^{2+}$ adsorption by an exemplary JSAC-COO⁻ sample at an initial $Pb^{2+}$ concentration of 25 mg/L and a pH of 4.15.

FIG. 8A to 8D shows the concentrations of Pb²⁺ following adsorption onto JSAC-COO⁻ at different contact periods. As shown in FIGS. 8A and 8B, within 1.0 minute of contact, the Pb²⁺ removal achieved in the experiment was in the range of 90.8 to 97.7%, at least 85, 86, 87, 88, 89, 90, 91, or 92% and/or up to 99, 98, 97.5, 97, 96.5, 96, 95.5, or 95%, for different initial concentrations at varying temperature and pH. In the particular experiment, plots of which are show in FIG. 8A, initial concentrations of 10 mg/L Pb²⁺ were reduced to 0.67 mg/L Pb²⁺ at a pH of 4.1 and 0.23 mg/L Pb²⁺ at a pH of 6.9, each at a temperature of 27° C. Initial concentrations of 25 mg/L Pb²⁺ were reduced to 2.13 mg/L Pb²⁺ at a pH of 4.2 and 0.93 mg/L mg/L Pb²⁺ at a pH of 6.9, each at a temperature of 27° C. At 15° C. shown in FIGS. 8C and 8D, the removal rates were found to be lower than analogous experiments at 27° C. shown in FIGS. 8A and 8B.

Following the rapid drop of Pb²⁺ concentration in water after the first minute, the remaining Pb²⁺ concentrations showed gradual decrease. At higher pH and temperature, final concentrations of Pb²⁺ were lower than at lower pH and temperature. At a pH of 4.2 and a temperature 15° C., Pb²⁺ concentrations were reduced from 25 mg/L, to less than 10 μg/L, e.g., less than 9.5, 9, 8.5, 8, 7.5, 7, 6.5, 6, 5.5, 5, 4.5, 4, 2.5, 1 μg/L or less, in 60 minutes. At a pH of 6.9 and a temperature 15° C., Pb²⁺ concentrations were reduced to below 10 μg/L in 30 minutes, e.g., no more than 28, 26, 24, 22, 21, 20 minutes, or less. At a pH of 6.9 and temperature of 27° C., Pb²⁺ concentrations were decreased to less than 10 μg/L in 15 minutes, e.g., no more than 14, 13, 12, 11, 10, 9.5, 9, 8.5, 8, 7.5 minutes, or less. The final Pb²⁺ concentrations showed exponential decay in all scenarios plotted in FIG. 8A to 8D. At a pH of 4.1 and temperature of 27° C., final Pb²⁺ concentrations from the initial 10 mg/L concentration were found to be represented by the exponential relationship in Equation 1.

$$C = 2.4932 e^{-0.244t} \quad \text{(Eq. 1)}$$

wherein C is Pb²⁺ concentration in mg/L and t is time in minutes. The relationship in Equation 1 had an R² of 0.73 valid for up to 15 minutes. Beyond 15 minutes, the Pb²⁺ concentrations were below the detection limit.

At a pH of 6.9, final Pb²⁺ concentrations from initial 10 mg/L concentrations were found to be represented by the exponential relationship in Equation 2.

$$C = 3.3451 e^{-1.307t} \quad \text{(Eq. 2)}$$

The relationship in Equation 2 had an R² of 0.88, valid for up to 5 minutes, beyond which the Pb²⁺ concentrations were below the detection limit.

For a pH of 4.2 and a temperature of 27° C., final Pb²⁺ concentrations from initial 25 mg/L concentration were found to be represented by the exponential relationship in Equation 3.

$$C = 4.4641 e^{-0.136t} \quad \text{(Eq. 3)}$$

The relationship in Equation 3 had an R² of 0.70, valid for up to 30 minutes, beyond which the Pb²⁺ concentrations were below the detection limit.

At a pH of 6.9 and a temperature of 27° C., the exponential decay relationship was found to be represented by Equation 4.

$$C = 5.9828 e^{-0.516t} \quad \text{(Eq. 4)}$$

The relationship in Equation 4 had an R² of 0.80, valid for up to 10 minutes, beyond which the Pb²⁺ concentrations were below the detection limit.

For a pH of 4.2 and temperature of 15° C., final $Pb^{2+}$ concentrations from initial 25 mg/L concentrations were found to be represented by the exponential relationship in Equation 5.

$$C=5.0313e^{-0.121t} \quad \text{(Eq. 5)}$$

The relationship in Equation 5 had an $R^2$ of 0.70, valid for up to 30 minutes.

For a pH of 6.9 and a temperature of 15° C., final $Pb^{2+}$ concentrations from initial 25 mg/L concentration were found to be represented by the exponential relationship in Equation 6.

$$C=6.3706e^{-0.297t} \quad \text{(Eq. 6)}$$

The relationship in Equation 5 had an $R^2$ of 0.79, valid for up to 15 minutes.

In all of the above exemplary test scenarios, the final $Pb^{2+}$ concentrations showed exponential decay, while the effects of pH and temperature were found to be dominant beyond the first minute of contact.

LEAD(II) REMOVAL AND INTERACTION EFFECTS: The adsorbent JSAC-COO⁻ showed more than 98.3%, e.g., at least 95, 96, 97, 97.5, 98, 98.25, 98.5, 98.75, 99, 99.25, 99.5% or more, removal of $Pb^{2+}$ in 15 minutes of contact period for variable initial concentrations, temperature, and pH as seen in FIG. 8.

Figure 9:
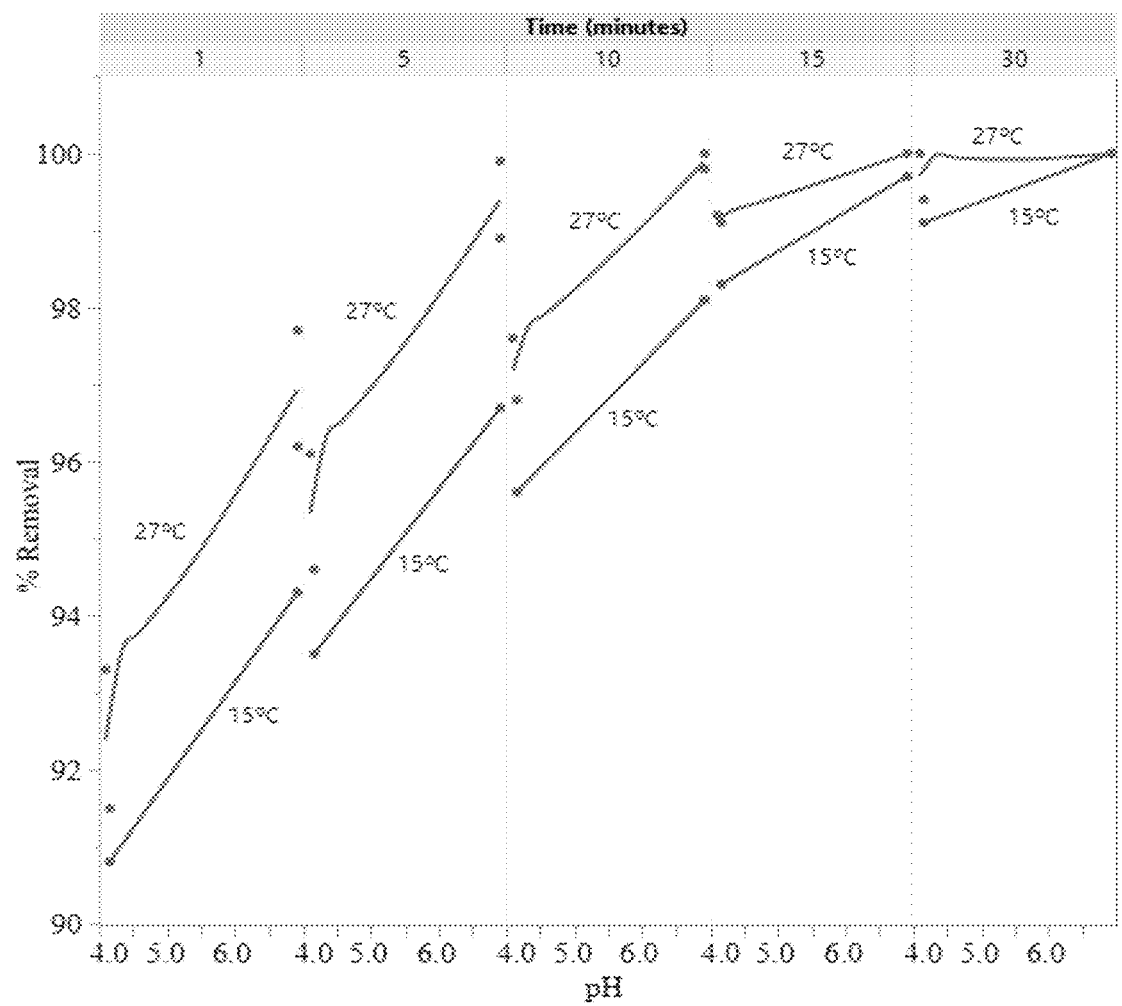
FIG. 9 shows plots portraying the effect of pH and temperature on lead removal efficiency of exemplary JSAC-COO⁻ samples over contact/exposure time.

FIG. 9 shows the interactive effects of pH and temperature are shown. At higher pH and temperature, $Pb^{2+}$ removal efficiency was higher. The parallel roughly plotted lines of percent removal (efficiencies) in FIG. 9 for different temperatures for up to 10 minutes indicate minimum to no interactive effect between pH and temperature, though both show increasing trends for $Pb^{2+}$ removal at higher pH. After 10 minutes of contact time (the rightmost two columns in FIG. 9), however, increased temperature and pH showed a decrease in removal rates, which might have been due to the low $Pb^{2+}$ concentrations in the aqueous solution after 10 minutes in the batch experiments (a flow system could behave differently). More than 98.0% removal of $Pb^{2+}$ ions was achieved by 10 minutes in all cases.

At 15° C., increasing pH from 4.2 to 6.9 increased the percent removal (efficiency) from 90.8% to 94.3% in the first minute. For the contact periods of 5, 10, and 15 minutes, the percent removal efficiencies increased from 93.5 to 96.7%, 95.6 to 98.1% and 98.3 to 99.7%, respectively. At 27° C., increasing pH from 4.2 to 6.9 increased the percent removal (efficiency) from 91.5% to 96.2% in the first minute, while the percent removal efficiencies increased from 94.6% to 98.9% within 5 minutes, and 96.8-99.8% within 10 minutes of contact. The results of the study plotted in FIG. 9, indicate that the JSAC-COO⁻ adsorbents reduced $Pb^{2+}$ ions from an initial concentration of 25 mg/L to trace concentrations of no more than 10 µg/L, e.g., no more than 9, 8, 7.5, 6.5, 5, 2.5, 1, 0.5, 0.1 µg/L, within 15 to 60 minutes of contact/exposure depending on pH and temperature. the JSAC-COO⁻ adsorbents removed more than 90%, e.g., more than 91. 92.5, 95, 96, 97, 97.5, 98, 99, 99.5%, or more, of $Pb^{2+}$ ions within the first minute of contact. Overall, $Pb^{2+}$ removal was higher at a pH of 6.9 than at a pH of 4.2, which may be attributable to decreasing pH neutralizing the surface charge of the carboxylates on the JSAC-COO⁻. Carboxylate ions (—COO⁻) are superior at adsorbing $Pb^{2+}$ than the uncharged –COOH.

Numerous modifications and variations of the present invention are possible in light of the above teachings. It is therefore to be understood that within the scope of the appended claims, the invention may be practiced otherwise than as specifically described herein.

The invention claimed is:

1. A method for making carboxylated jute stick activated carbon, the method comprising:
   heating a mixture comprising (i) comminuted jute stick and (ii) an activating agent comprising bicarbonate under an inert atmosphere, to obtain a jute stick activated carbon; and
   carboxylating the jute stick activated carbon to obtain carboxylated jute stick activated carbon.

2. The method of claim 1, wherein the carboxylating comprises:
   mixing the jute stick activated carbon with $H_2SO_4$ and $HNO_3$, to obtain a mixture;
   sonicating the mixture, to obtain a sonicated mixture; and
   recovering the carboxylated jute stick activated carbon from the sonicated mixture.

3. The method of claim 2, wherein the $H_2SO_4$ and $HNO_3$ are concentrated and are present in the mixing at a ratio in a range of from 1:2 to 6:1.

4. The method of claim 2, wherein the sonicating is for a period of from 4 to 6 hours.

5. The method of claim 2, wherein the recovering comprises:
   diluting the sonicated mixture with water, to obtain a diluted mixture;
   separating the diluted mixture into an upper layer and a lower layer; and
   recovering the carboxylated jute stick activated carbon from the lower layer.

6. The method of claim 1, wherein, in the heating, a mass ratio of a dry mass of (i) the comminuted jute stick to (ii) the bicarbonate is in a range of from 1:1.5 to 1:8.

7. The method of claim 1, wherein the heating is at a temperature in a range of from 700 to 1000° C., and/or
   wherein the heating takes place for a period in a range of from 3 to 8 hours.

8. The method of claim 1, comprising, in the heating, bringing the comminuted jute stick and bicarbonate to a temperature in a range of from 800 to 900° C. at a heating rate of from 3 to 7° C./minute; and heating at the temperature for a period in a range of from 4 to 6 hours, to obtain the jute stick activated carbon; then
   cooling the jute stick activated carbon to no more than 55° C. at a rate of from 7.5 to 12.5° C./minute.

9. The method of claim 1, further comprising, after the heating:
   cooling the jute stick activated carbon to no more than 50° C., to obtain a cooled jute stick activated carbon;
   washing the cooled jute stick activated carbon with an acid, to obtain an acid-washed jute stick activated carbon; and
   deacidifying the acid-washed jute stick activated carbon to a pH in a range of from 6.5 to 7.5.

10. The method of claim 1, wherein the bicarbonate comprises at least 75 wt. % of an alkali metal and/or alkaline earth metal bicarbonate.

11. The method of claim 1, further comprising removing jute fibers of a jute plant to provide a fiberless jute stick, and comminuting the fiberless jute stick to provide a comminuted jute stick, prior to the heating.

12. The method of claim 1, wherein the comminuted jute stick comprises about 21.5 wt % of lignin and/or about 40.8 wt % of α-cellulose, each relative to a total weight of the comminuted jute stick.

* * * * *